Figure 1:
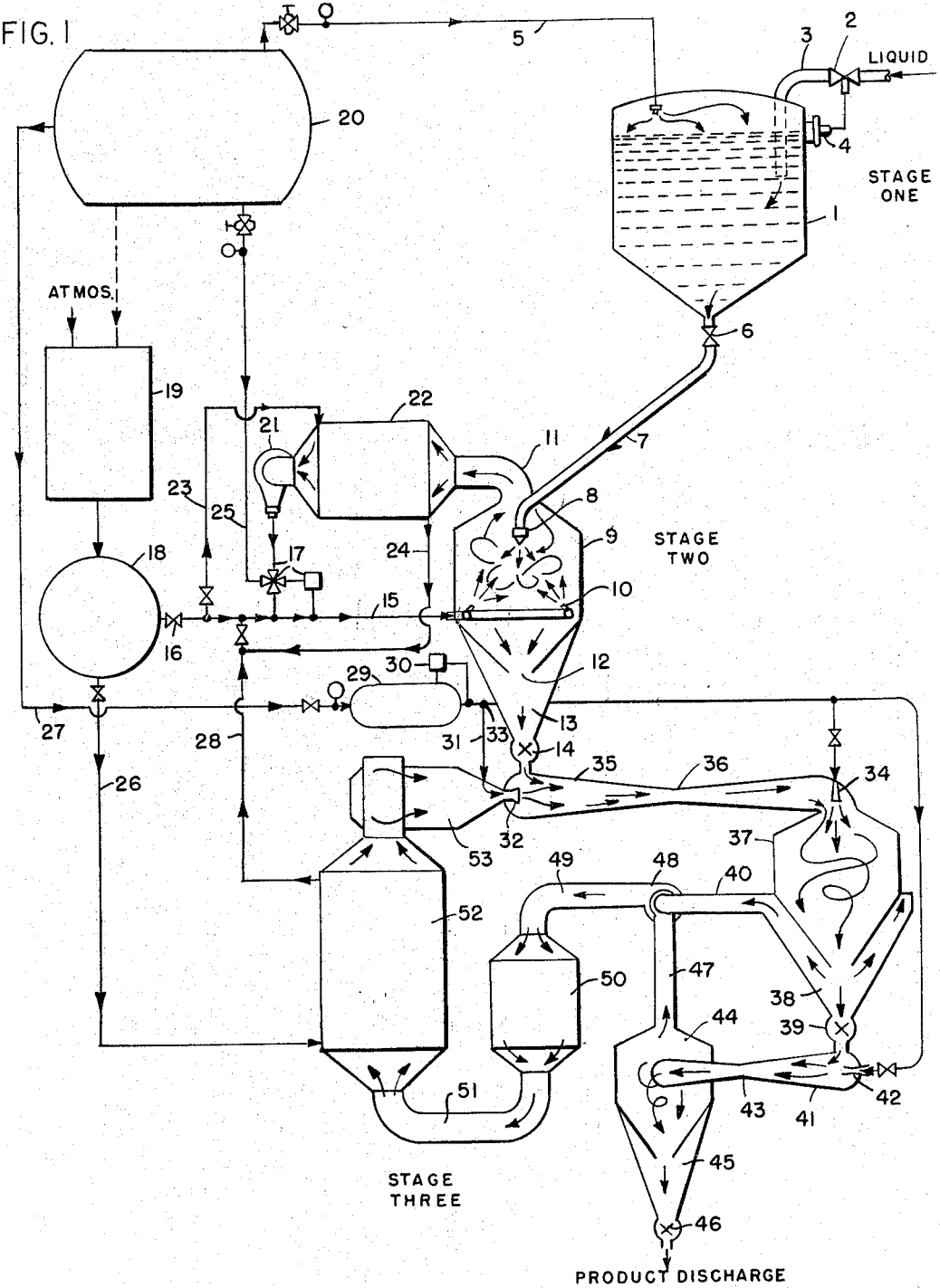

Dec. 13, 1966 K. H. SEELANDT 3,290,788
FLUID-SOLIDS CONTACTING METHODS AND APPARATUS, PARTICULARLY
FOR USE IN DESICCATING ORGANIC MATERIALS
Filed July 16, 1964 4 Sheets-Sheet 1

INVENTOR:
KARL H. SEELANDT
BY Carl C. Batz
ATT'Y

STAGE ONE
STAGE TWO
STAGE THREE
STAGE FOUR OR ALTERNATE STAGE THREE

PRODUCT DISCHARGE

INVENTOR:
KARL H. SEELANDT

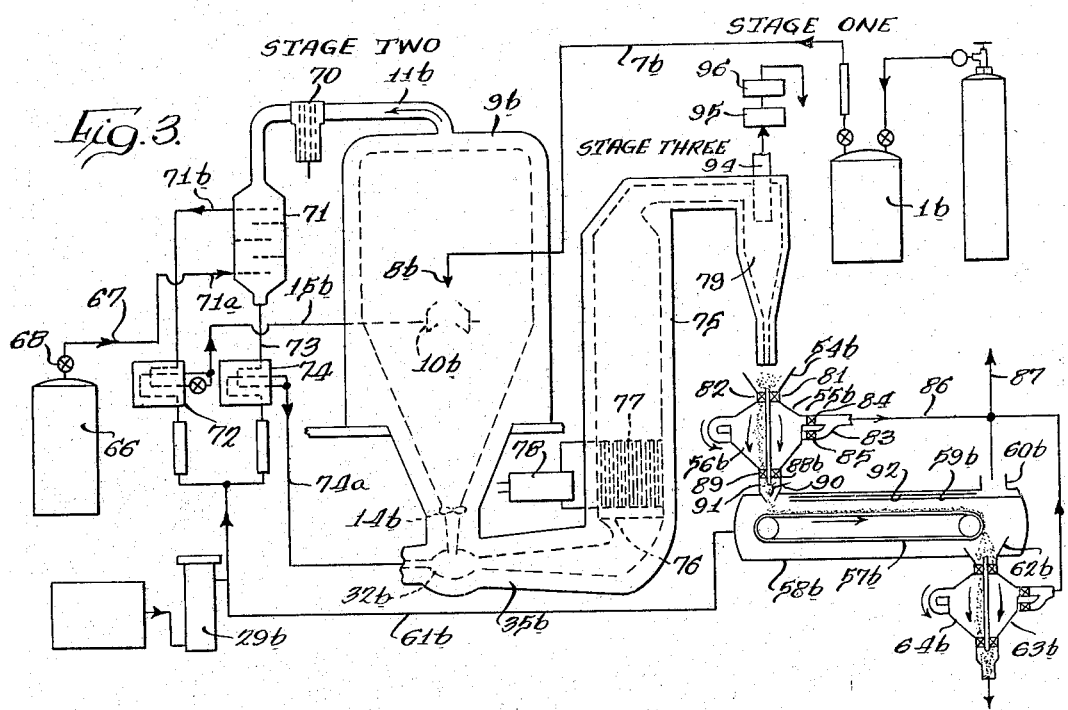
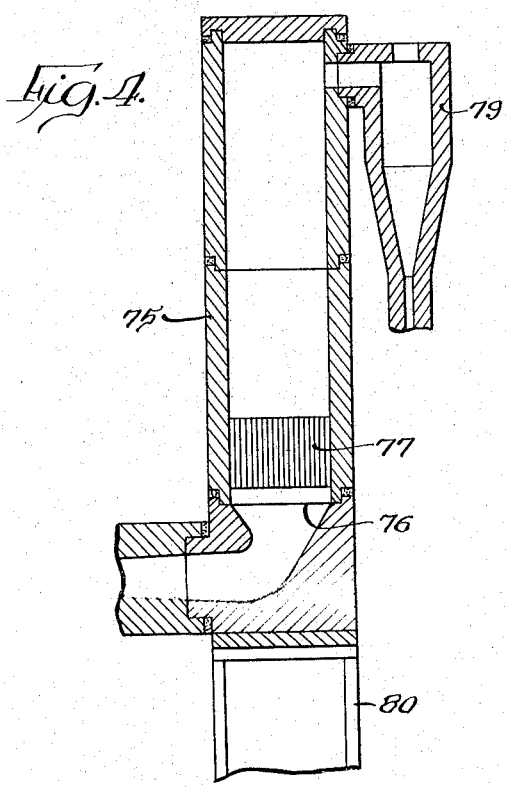
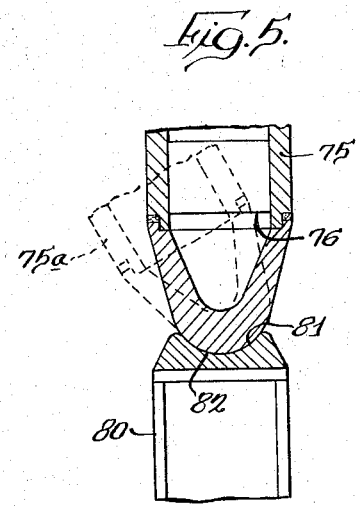

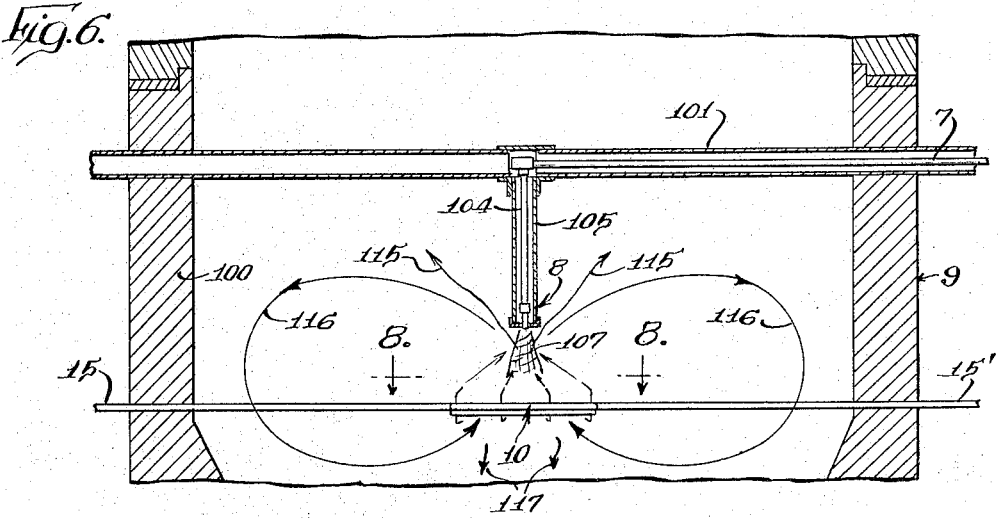
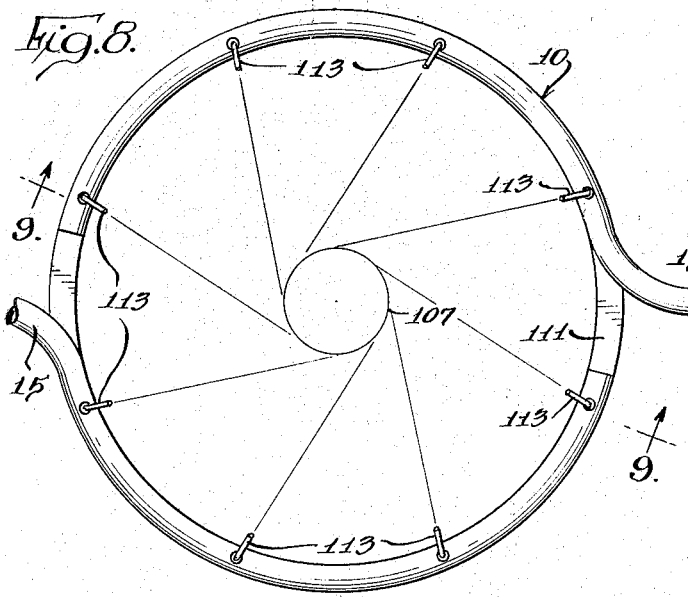
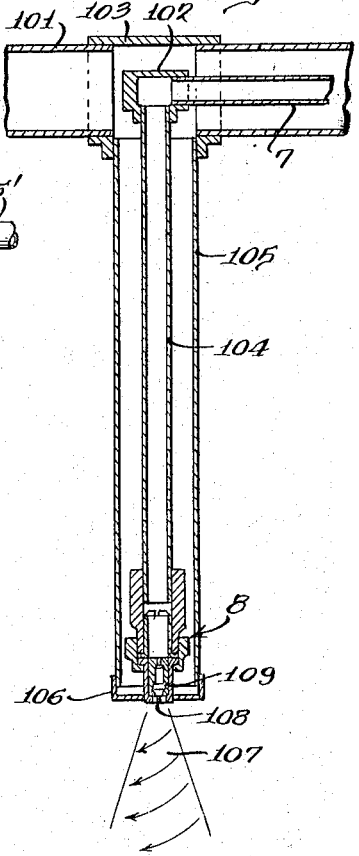
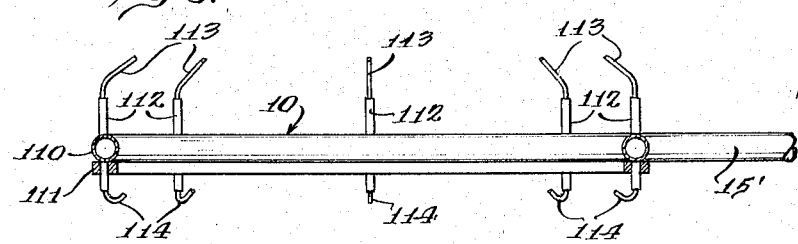

United States Patent Office 3,290,788
Patented Dec. 13, 1966

3,290,788
FLUID-SOLIDS CONTACTING METHODS AND APPARATUS, PARTICULARLY FOR USE IN DESICCATING ORGANIC MATERIALS
Karl H. Seelandt, 900 N. Lake Shore Drive, Chicago, Ill.
Filed July 16, 1964, Ser. No. 384,285
42 Claims. (Cl. 34—5)

The present application is a continuation-in-part of an application entitled, "Desiccating Organic Materials," Serial No. 169,317, filed January 29, 1962, now abandoned.

This invention relates in general to fluid-solids contacting methods and apparatus, and an exemplary embodiment of the invention relates to novel methods and apparatus for desiccating soluble or primarily soluble and insoluble organic materials in liquid solution.

The removal of water from food and related products in order to preserve them for long periods of time is a concept well known in the art. Since water serves as a catalyst for food spoilage, various methods have been proposed in the past to remove water from food when it is desired to store the food for a long period. One widely used method is to spray liquid foodstuff into a lofty tower which is charged with large quantities of circulating hot air that functions to evaporate the moisture from the foodstuff. This method has proved to be undesirable, in that it has necessitated the use of bulky and expensive apparatus. Additionally, the dried product formed by this method also has certain undesirable characteristics, such as, the desiccated particulate solids have a relatively small, hard and non-porous surface area, and a high bulk density. These characteristics hinder rehydration, and contribute to undesirable agglomeration of the particulates during rehydration. Also, in high temperature spray drying undesirable chemical reactions often occur in heat-sensitive materials during the atomized liquid droplets' exposure to the circulating charge of hot air. These chemical reactions contribute to an excessive loss of desirable volatile constituents of the foodstuff which are pertinent to flavor and aroma.

To obviate the problems noted above in connection with high temperature spray drying, it has been proposed in the past to use a "freeze drying" method wherein the material to be dried is first frozen and then water is removed by sublimation. Although freeze-drying methods have been known to produce a product having more desirable characteristics than high temperature spray drying methods, freeze-drying methods have not met with wide commercial acceptance since known freeze-drying methods have been more costly than conventional spray drying, freezing or canning processes. One of the factors which has rendered known freeze-drying processes extremely expensive, has been the practice of conducting the freeze-drying method in a "batch type" operation. Since it is difficult to obtain a desired volume of production by batch methods, this type of process and apparatus has proved to be commercially unacceptable in certain industries. In order to provide the heat for sublimation it has been proposed to use radiation in the infra-red range. Heretofore these methods have proven unsatisfactory in that the radiation ranges which are presently used function to heat the article, as well as subliming the ice, so that undesirable scorching of the product takes place in the later stages of drying when the "freeze-front" recedes into the interior of the product being dried.

A further disadvantage occurs during freeze drying of liquid materials which are usually foamed, frozen in a vacuum, and then freeze-dried. In such a process the heat for sublimation is supplied either by radiation from an infra-red heating element, or by conduction heating from a heated shelf upon which the foamed and frozen liquid is placed during the freeze drying operation. During the foam and freeze portion of the cycle, stratification occurs and the denser constituents of the liquid tend to settle in layers throughout the foamed, frozen and later dried block of liquid foodstuff. In a subsequent operation the freeze dried foam is milled and ground to a desired particle size. The resultant particles are not homogenous, cells are ruptured in cellular type material such as tomato and as a result of these combined effects the dried particulate do not reconstitute readily into the original liquid material. In addition, this type of process is very slow and costly.

In another method of freeze drying liquid materials the liquid is sprayed onto chilled rollers and frozen into platelets, which are subsequently passed through a common infra-red radiation zone or dried on a heated shelf as described above. The dried platelets are subsequently milled or ground to desired particle size. As in the foam freeze drying technique some stratification and cell rupture still occurs with this process, as does some scorching of the product. The resultant particles are not homogenous and do not readily reconstitute into the original liquid.

It is also well known in the art to freeze liquid material into pellets by spraying the liquid into a cold gas environment for the purpose of obtaining a frozen particulated liquid to accommodate later processing in a freeze dryer or otherwise. While this type of frozen pellet is homogenous, and there is somewhat less cell rupture, no water is removed during the spray freezing operation. Furthermore, the remaining water is evenly distributed as ice throughout the frozen particles interior and exterior. In addition the frozen particle is virtually non-porous. When this type of frozen particle is processed through a freeze dryer of either the shelf or radiation heated type, the freeze drying operation requires approximately the same length of time as for drying the previously described frozen platelets. The primary reason being that the dense, frozen particulate or platelet does not facilitate diffusion of sublimed water vapor from the interior of the particle or platelet during the later stages of drying when the "freeze-front" has receded into the interior of the product. Furthermore, the heat for sublimation cannot be supplied at the highest intensity during the later stages of freeze drying because it would scorch or burn the already dried layer of material above the freeze front. As a result, the freeze drying of either frozen particles or platelets is much slower than the method described in the present application. Also, the freeze dried frozen pellets do not exhibit the required properties and characteristics which facilitate ready reconstitution into the original liquid material. Rather, they tend to agglomerate or "lump" during reconstitution.

Accordingly, a primary object of this invention is to provide a process and apparatus for low temperature desiccation of soluble, or primarily soluble and insoluble organic materials in liquid solution which is susceptible to continuous operation. A related object is to provide a method of initially freezing the liquid material into frozen particulate solids and ice, while simultaneously removing some of the liquids contained water; and yet further to freeze the particulates in such a manner as to concentrate the remaining water, (ice) at or near the outer periphery of the frozen particulate solid, while partially desiccating the particulates interior. A further object is to spray and freeze the liquid material so that pores, vents and cracks occur in the outer periphery of the particulates to facilitate later water vapor removal. Another object is to freeze the liquid material instantaneously at very low temperatures to effect transport of water from the interior of contained cells while forming the water into ice in the interstices between the cells, thereby avoiding cell rupture due to expansion of frozen water (ice) within the cells as occurs at slower freezing rates. Still another object is to provide an improved freeze-drying process which is capable of effecting the desired drying in a minimum amount of time. Yet another object of the invention is to provide a freeze-drying process which will produce extremely porous, discrete, amorphous or spherical particulate solids having a large surface area and a low bulk density, which are capable of being rehydrated without any loss of flavor and aroma. A still further object of the invention is to provide a freeze-drying process wherein the radiant heat for sublimation is provided at a specific wave length which will pass through most organic products, but not through ice; thereby permitting a maximum of intensity of heat for sublimation to be applied throughout the freeze-drying operation without danger of scorching or burning the organic material and thereby facilitating speedier sublimation of the ice. A yet further object of this invention is to provide means for accelerating water vapor removal from the particulate surfaces during the freeze-drying operation.

A feature of the present invention is to provide a method and means whereby soluble, or primarily soluble and insoluble organic materials in water or other liquids are freed of the bulk of moisture or liquids in an early stage, and particulate matter surfaced with ice is recovered substantially free of moisture or liquid in a later stage.

Another feature of the present invention is to provide a process as defined in the preceding paragraph wherein a high velocity jet stream of gas having a temperature below the freezing point of the organic liquid solution is utilized to disintegrate the organic liquid solution into a fine mist of moisture forming a very substantial portion of the liquid, and into particulate solids coated with ice. A related feature is to remove the moisture mists in the form of microcrystalline particles of ice at an early stage of the process, and to remove the frozen particulate solids at a later stage of the process. A further related feature of the present invention is to concentrate the organic material and ice at or near the outer periphery of the frozen particulates and to remove the surrounding ice at a later stage in the process. A still further feature of the present invention is to provide effective steps and means for the removal of residual moisture in the particulate matter.

Still another feature of the invention is to provide processing apparatus and method steps for providing an economical super-cooled process gas, and recuperating said gas by substantially removing its contained moisture while maintaining a super-cooled temperature to facilitate reuse of the recuperated super-cooled gas in the process.

A still further feature of the invention is the provision of novel fluid bed apparatus including: a hollow vessel having heat transfer means including a wall structure means within said vessel defining a plurality of columns; grid means adjacent to the heat transfer means; means for introducing a particulate substance into said vessel through an inlet means; means for fluidizing said substance in said heat transfer means; means for heating said wall structure means; and means for removing said substance from said vessel through an outlet means. A related object of the invention is to utilize a fluid bed apparatus described above in a process for desiccating organic materials.

Other objects, features and advantages will hereinafter become more fully apparent from the following description taken in connection with the annexed drawing, wherein:

FIG. 1 is a schematic or flow diagram illustrating apparatus and procedures steps embodying the invention;

FIG. 2 is a view similar to FIG. 1, but showing a first modified form of apparatus and procedure;

FIG. 3 is a view similar to FIG. 1 and FIG. 2, but showing a still further form of apparatus and procedure;

FIG. 4 is an enlarged, fragmentary, sectional view taken generally centrally through the fluidized bed illustrated in FIG. 3;

FIG. 5 is a fragmentary side view of part of the structure illustrated in FIG. 4;

FIG. 6 is a fragmentary enlarged sectional view taken centrally of the reaction vessel;

FIG. 7 is an enlarged central sectional through the liquid dispensing nozzle means;

FIG. 8 is an enlarged view taken generally along line 8—8 of FIG. 6; and

FIG. 9 is an enlarged sectional view taken generally along line 9—9 of FIG. 8.

While this invention is susceptible of embodiment in many different forms, there is shown in the drawings and will herein be described in detail only preferred embodiments, with the understanding that the present disclosure is to be considered as an exemplification of the principles of the invention and is not intended to limit the invention to the embodiments illustrated. The scope of the invention will be pointed out in the appended claims.

The term "gas" is used in this disclosure to refer not only to inert gases, but also to air and mixtures of gas and air, and to other aeriform bodies as well. The term "super-cooled" gas is used in the disclosure to refer to any gas utilized at a temperature between its liquid temperature and 32° F. References in the disclosure to an organic material in liquid solution refer not only to primarily soluble organic materials in solution in water, but also to any primarily soluble and any primarily insoluble organic material in solution in water and any other liquid carrier such as alcohol, glycerine, petroleum, etc.

The methods and apparatus embodying the process have four distinctly different operational stages which are illustrated in the drawings and can be described in chronological sequence as: the liquid transport and discharge stage; the liquid freeze-disintegration-evaporation stage; the final desiccation stage, which may be by gas ejection-sublimation, by vacuum radiation-sublimation, by fluidized bed evaporation, or by combinations of each of these steps; and, a fourth stage embodying the gas supply and recuperation system.

STAGE ONE

In stage one relating to liquid transport and discharge, the organic-liquid solution which has first been expressed, extracted, pasteurized or otherwise prepared can be pumped, from a supply source, through a suitable pipe-line to a desired level in the liquid surge tank. As illustrated in FIG. 1, the liquid is pumped through a solenoid valve 2 and a suitable pipe-line 3 to the liquid surge tank 1 where the desired liquid level is maintained by the liquid level indicator-controller 4. Inert gas pressure is applied to the liquid in the head space of the surge tank through a gas-line 5 which in turn is supplied from a suitable pressure regulated inert gas pressure vessel. Heating or cooling coils can be submerged in the liquid as required. The pressurized organic-liquid solution is then discharged through a suitable control valve 6 and an insulated pipe-line 7 and a pressure discharge nozzle 8 which is positioned within the freeze-distintegration-evaporation vessel 9 of the second stage. Obviously, multiple discharge nozzles can be utilized to discharge the liquid solution from the surge tank into a larger freeze-distintegration-evaporation vessel. In some instances gravity flow of the liquid solution will provide sufficient pressure for discharge. Such physical and chemical characteristics of the organic-liquid solution as its percent solids content, temperature and viscosity, will influence the liquid's dispersion through the pressure discharge nozzle and subsequently influence the size and bulk density of the discrete frozen particulates formed during the freeze-disintegration-evaporation operation.

The mechanism of dispersion of the liquid stream and its "break-up" by impingement of the super-cooled inert gas jet streams is dependent on the liquid streams discharge diameter and velocity, percent solids content, surface tension, and its viscosity. The principal object is to produce a high ratio of surface to mass in the liquid phase by dispersing the bulk mass of liquid into turbulent filmy waves expanding out from the nozzle orifice until the film sheets or ligaments can be readily disintegrated and frozen by the super-cooled inert gas jet streams to be hereinafter described.

The discharging liquid stream is turbulent throughout and is broken up by the impingement of the super-cooled inert gas stream. This can be explained on the basis that the liquid stream is in turbulent flow and exhibits particle motion with radial velocity components, such that when the liquid stream is no longer confined by the discharge nozzles orifice, the liquid film ligaments are restrained only by the surface tension force of the organic-liquid solution and dispersion of the liquid stream only occurs as the surface tension is overcome. The higher the viscosity of the liquid the longer will be the "break up" distance of the discharged stream. When the pressure is increased, the liquid streams "break-up" distance decreases.

The discharge nozzle is designed to facilitate liquid stream "break-up" by imparting tangential and axial velocity components. A design of pressure nozzle which appears to be most suitable features a discharge nozzle which has a circular orifice with a grooved venturi type throat which will emit the liquid product in the form of a turbulent hollow cone having a cone angle of from 38° to 57°. This type of nozzle induces fully developed turbulence into the liquid stream before it issues from the orifice thereby inducing stability to the dimensions of the conical turbulent dispersion it emits. This type of spray is readily distintegrated by the impinging super-cooled gas jet streams within a short distance from the discharge nozzle and within a small diameter tube or vessel. The liquid stream which is emitted exhibits particulate motion with strong axial and mild tangential velocity components. As a result, the liquid, as it passes through the nozzle orifice forms a turbulent annular ring, or cone with an average velocity.

As the liquid is discharged into the vessel 9 a natural increase in surface will result followed instantly by expansion of individual droplets due to the presence of higher pressure entrained gases in their interior which do not escape during the initial discharge through the pressure nozzle; and thereby sub-environmental pressures are created which will cause voids or pores inside the frozen particulate.

STAGE TWO

The freeze-distintegration-evaporation stage of the process cannot be treated as a unit operation It features three distinctly different concurrent operational phenomena which can best be described as the disintegration of the turbulent conically dispersed liquid stream into water mists and droplets having; a nucleus of organic material, and the simultaneous freezing of the resultant droplets into discrete frozen particulates; the constant evaporation from the distintegrated droplets and the simultaneous partial dehydration of the particulate nuclei; and, the flow of gases and motion of the frozen particulate solids within the vessel, and exhausting and discharging, from the vessel. A fourth feature of the operation, the gas supply and recuperation system can also accommodate the preceding and following stages of the process.

As the turbulent, dispersed stream of organic-liquid concentrate enters the insulated freeze-disintegration-evaporation vessel 9, via the insulated pipe-line 7 and discharge nozzle 8, it is disintegrated by impingement of the high velocity, super-cooled inert gas jet streams issuing from the gas nozzles and manifold 10 in counter-current flow with respect to the flow of the organic liquid. Manifold 10 is supplied from the gas supply and recuperation system to be hereinafter described. The angles of the impinging gas jet streams are such that they strike the turbulent conically dispersed liquid stream tangentially in an upward sweep simultaneously freezing and disintegrating the turbulent conical liquid stream into an upward swirl of frozen particulate solids and saturated cooled inert gas. The swirling saturated inert gas stream exits the vessel via the exhaust duct 11 which exhausts the gas to the gas recuperation and supply system. The resultant disintegration of said filmy liquid ligaments into an array of water mists and fine droplets further enlarges the surface area of the bulk mass of organic-liquid solution thereby facilitating the evaporation of the water mists and the freezing of the larger organic-liquid drops to form discrete frozen particulate solids. The water mists which are not immediately evaporated exit the reaction vessel as micro-crystalline particles of ice. Evaporation of liquid from the surface of said frozen particulate solids is caused by the friction created by the impingement of the super-cooled gas jet stream upon the solids. The interior of said frozen particulate solids is partially dehydrated during their nucleation due to the capillary attraction of the warmer liquid contained in the interior of said particulates to their super-cooled surface, and thus a predominant percentage of remaining moisture is concentrated in the form of ice at the outer periphery of said frozen particulates. Growth of frozen particulate nuclei by heterogenous and homogenous nucleation is facilitated by entrainment of said nuclei by the swirling super-cooled gas jet stream, which circulate and recirculate said nuclei through the area of the area of the aforementioned turbulent conically dispersed wavy liquid sheets or ligaments and their disintegrated array of mists and droplets, thereby effecting condensate growth of organic-liquid upon the outer periphery of said super-cooled nuclei until the mass of the frozen particulate solid is sufficient to overcome the "lift" of the swirling super-cooled gas jet streams, thereby permitting said frozen particulate solids to gravitate through the orifice 12 in the conical bottom of the vessel 9 into a quiescent zone 13 and through a rotary product valve and discharge duct 14 which in turn is positioned within the third stage final desiccation vessel into which the said frozen particulate solids are deposited.

The droplets created by disintegration of the organic liquid solution are either pure water, or water containing combined super-cooled soluble and/or insoluble/organic nuclei which will naturally be more hygroscopic and more thoroughly saturated with water. The combined soluble and insoluble, hydrophobic, super-cooled organic nuclei invariably consist of a non-hygroscopic insoluble super-cooled nuclei which "locks" hygroscopic soluble nuclei into the ice lattice of its surface force field. Such an aggregate therefore has a higher probability of attaining the largest size as a frozen particulate solid.

Homogenous nucleation occurs as the super-cooled pure ice nucleus collects small groups of water molecules which chance to become oriented into an ice-like configuration on the super-cooled ice nucleus. The lower the temperature of the ice nucleus, the greater the size and frequency of formation. At lower temperature there is a corresponding increase in the rate of formation of pure ice frozen particulate solids and their growth in size by homogenous nucleation of the water by the super-cooled pure ice nucleus.

The freezing of water containing combined soluble and/or insoluble super-cooled organic nuclei which are either hygroscopic, non-hygroscopic and/or combinations of both can be likened to heterogenous nucleation wherein the super-cooled organic nuclei initiate crystallization and the formation of frozen particulate solids. The temperature required for heterogenous nucleation of the disintegrated liquid drops by super-cooled organic nuclei is considerably less to create a mean size of frozen particulate solid. Since heterogenous and homogenous nucleation occur simultaneously, and at the same temperature during the freeze-disintegration operation; and the rate of formation and growth of frozen particulate solids of pure ice (homogenous nucleation), is slower than the formation and growth particulate solids with organic nuclei (heterogenous nucleation), at a given temperature and in a given time; it follows that the primarily organic particulate solids formed are substantially larger and more numerous (about 90–95%) than the pure ice particulates.

The growth rate of the particle is controlled not only by the rate at which water vapor diffuses to its surface, but by the rate of condensation, which is limited by the rate at which the liberated heat of evaporation is dissipated. Nearly all this heat is lost from the particulate surface by convection through the swirling gas stream.

Fundamental to the liquid disintegration and freezing operation are the simultaneous heat and mass transfer processes occurring during the evaporation of the water mists and the evaporation from the droplets in the spray. The evaporation from droplets will consist of a period of surface evaporation, or constant-rate evaporation period, followed by a period when the evaporation rate falls off continually, or the falling-rate period. During freeze-disintegration of the liquid stream the constant rate period and the falling-rate period occur simultaneously and in a matter of seconds. The rate of heat transfer from drops to the surrounding gas medium will be proportional to the droplet surface area; the thermal conductivity of the surrounding medium and the temperature difference. Dissolved organic materials will lower the normal vapor pressure of the liquid and the vapor pressure and temperature differences causing mass and heat transfer, respectively, are lowered so that the evaporation rate will be less than for the pure water drops.

In addition to the effect on the vapor pressure the presence of solids introduces all the complications usually encountered in the falling-rate period of the drying of solids. For the evaporation of drops containing a dissolved component the drop evaporates as though it were saturated even though its average concentration is well below saturation. This can be explained on the basis that the rate of diffusion of the dissolved material back into the drop is slow compared with the evaporation rate, and hence the solids concentrate at the surface of evaporation faster than they can diffuse toward the center of the drop. Pure liquid contained within the interior is also drawn to the cooled surface of the drop or particulate by capillary action, also facilitating the transfer of heat to the surface of evaporation.

It can readily be seen from the preceding, that the liquid droplets which contain organic materials will be transformed into discrete frozen particulate solids whose interior will be partially desiccated and very porous and whose outer periphery will consist of primarily soluble and/or insoluble organic material which has served as the nucleus for continuous condensation-evaporation-condensation until the condensate layer has increased the particulate mass to the point where it can overcome the velocity of the gas stream and fall to the discharge tube of the vessel.

In addition to supplying the energy for disintegration and freezing the gas flow aids in dispersing and mixing the liquid stream. The frozen particulate solids also tend to follow the gas flow pattern. In the arrangement depicted in FIG. 1, the gas jet stream enters tangentially upwards, creating a spiral with tangential velocities of 10 to 15 times the magnitude of the axial velocity, thereby facilitating both particle motion and gas exhaust.

The high initial velocity of the liquid stream causes it to penetrate some distance into the tangentially upward impinging gas jet streams before disintegration-freezing, and deceleration of the terminal velocities. As the disintegrated liquid droplets and /or frozen particulates lose their initial momentum, they begin to follow the spiral motion of the gas stream. The particle falling at its terminal velocity is subjected to the drag of the centrifugal field and gradually takes on radial and tangential components. Its resultant velocity is due to the combined effects of gas friction in a tangential direction, centrifugal force, gravity, and the axial component of gas stream flow.

With the super-cooled gas stream issuing through several nozzles at an angle to the radius and between 25° and 35° to the circumference of the vessel the gas spiral is slightly less than the diameter of the vessel and diminishes in diameter as the angle of the circumference increases.

If the velocity of the counter-current flow of gas is sufficient the frozen particles will turn to the area of the liquid stream disintegration again and again (resulting in the nucleation phenomena previously described) until finally their mass will overcome the velocity of the gas stream and they will gravitate to the rotary product valve and discharge duct which facilitates transfer of the frozen particulate solids to the final desiccation vessel.

The frozen organic particulate solids discharged from the liquid freeze-disintegration-evaporation operation are discrete frozen particulate solids with a partially dehydrated and very porous interior and a roughly spherical, or amorphous outer periphery. This outer periphery consists of a somewhat denser, yet porous, shell of organic material which has served as the super-cooled nucleus for the condensation growth and, simultaneously, as the surface of evaporation during the growth of the condensed ice layers.

The water which has not been evaporated in the operation is predominant as ice at the surface of the frozen particulate solid where it can be removed readily in the final desiccation operation, either by ejection-sublimation, vacuum-radiation sublimation, or fluidized bed evaporation; or a combination of each as will be shown hereinafter.

Manifestly, the higher the pressure of the inert gas, the more thorough will be the disintegration of the organic liquid. While gas pressures in the range of 2000 p.s.i.a. have been found to be most desirable, pressures of 45 p.s.i.a. to 85 p.s.i.a. have proved to be effective. It is preferred that there be a temperature difference of at least 2000° F. between the inert gas and the liquid product, however, temperature differences approaching 400° F. are most desirable. It is also preferred that the inert gas enter the reaction zone at a high velocity, as, for example, in the range of 650 feet/sec.

Referring now to FIGS. 6–9, wherein a preferred form of Stage Two apparatus is shown, it will be noted that the wall 100 of the reaction vessel 9 is relatively thick, and it will be understood that the reaction vessel is formed of a suitable insulating material. The liquid inlet pipe 7 extends into the vessel through an opening in the side thereof, and is surrounded by a tubular jacket 101 which extends from side to side of the vessel to support the nozzle assembly therein. An elbow 102 connects pipe 7 with a downwardly extending pipe 104; and a T-connection 103 connects the tubular jacket 101 with a downwardly extending tubular jacket member 105, which is positioned in spaced relationship with respect to pipe 104. Insulating packing, or the like, is provided in the tubular passages between pipe 7 and jacket 101, and pipe 104 and jacket 105 to retain the liquid flowing through pipes 7 and 104 at a constant temperature. Nozzle 8 is a conventional commercially available variety, which is adapted to disperse the liquid into the reaction vessel in the aforementioned conical spray (as is shown generally at 107 in FIGS. 7 and 8), and includes a circular orifice 108 and a grooved throat 109. Nozzle 8 extends downwardly through an opening in an end cap 106 which is fixed on the lower end of jacket member 105.

Manifold 10 is generally circular in plan view and is positioned in the reaction vessel below nozzle 8 and concentric therewith. An annular ring 111 supports the manifold 10, which in the illustrated form is defined by the arcuate ends of inert gas inlet pipes 15 and 15'. A plurality of nozzles 112 are positioned around manifold 10, and each includes an upper nozzle member 113 and a lower nozzle member 114. As can be best seen in FIG. 9, each of nozzle members 113 and 114 is directed upwardly toward spray 107, and as can be best seen in FIG. 8, the gas flowing from nozzle members 113 and 114 is directed generally tangentially to the spray 107. Thus, the resulting micro-crystalline particles of ice escape from the reaction zone and pass upwardly, as indicated by directional arrows 115 in FIG. 6, to the exhaust duct 11 along with the saturated exhaust gas. The frozen particulate solids follow a path generally indicated by directional arrows 116 in FIG. 6, wherein they pass outwardly from the reaction zone toward the wall of the vessel, and then are drawn upwardly back into the reaction zone by the suction of the gas issuing from nozzles 112. Nucleation and particle growth of the frozen particulates occur as they reenter the reaction zone, until they are a sufficient mass to overcome the force of the incoming gas, at which time they will fall into the quiescent zone 13 at the lower portion of the vessel.

GAS SUPPLY AND RECUPERATION

As previously mentioned, the high velocity, super-cooled, nitrogen gas is issued from the gas jet nozzles 10. The liquid nitrogen gas is stored in the storage dewar 18, at a temperature (for nitrogen) of (−320° F.). The liquid nitrogen supply can be maintained by a cryostat 19 which uses either atmosphere or nitrogen gas from the pressurized nitrogen gas storage vessel 20 for liquefaction. The super-cooled gas "boil-off" from the liquid nitrogen contained in the storage dewar is issued through the gas line 15 and regulating valve 16 and mixed with warmer nitrogen gas issuing from the condenser 22 and the centrifugal compressor 21, through the gas-line and regulating valve 17. The flow and mixture ratio of warm and super-cooled gases issuing through the regulating valves 16 and 17 is controlled by the temperature indicator-controller 17 whose thermocouple is located in the gas-line 15. The mixed gas is issued through the gas-line 15 to the gas jet manifold and nozzles 10 which is positioned within the vessel 9. Dry nitrogen make-up gas can be issued, as required, from the storage vessel 20 through the gas-line 25 to the regulating valve 17 and mixed with the cool gas exhausted from the condenser 22 by the compressor 21.

The saturated nitrogen exhaust gas exits the vessel via the exhaust duct 11 and is ducted to the plate-type condenser 22 and then to the centrifugal compressor 21 where it is compressed and charged into gas-line and valve 17 to be mixed with the gas issued from the gas-line 15, etc. Super-cooled nitrogen gas is also supplied to the condenser 22 through the gas-line and valve 23 and subsequently discharged through the gas-line and valve 24 and ejected into the gas-line 15, etc., etc.

The nitrogen gas supply and recuperation system can also accommodate the first and third stages of the process. The pressurized nitrogen gas from the nitrogen gas storage vessel can supply the required inert gas pressure (via the gas-line and pressure regulating valve 5) to the pressure head of the first stage liquid transport and discharge operation, and, as will be shown hereinafter, the system can also accommodate the third stage final desiccation system via the gaslines and valve 26, 27 and 28.

STAGE THREE

The final desiccation of the discrete frozen particulate solids is accomplished by the apparatus and steps embodying the third stage of the process. A variety of apparatus and steps can be utilized for the third stage. All of these variations fall into one of five general categories of final desiccation methods which can be described as: final desiccation by forced gas (or air), ejection-sublimation; final desiccation by vacuum-radiation sublimation; combined partial desiccation by forced gas (or air), ejection-sublimation followed by final desiccation in a vacuum-radiation sublimation apparatus; final desiccation by fluidized bed evaporation; or combined partial desiccation by fluidized bed evaporation followed by final desiccation in a vacuum-radiation sublimation apparatus.

Such physical and chemical characteristics of the frozen particulate solid as the percent ice content within it, and/or upon its outer periphery, its resistance or adaptability to various final desiccating temperatures, environments and processing steps, and its quality control requirements determine the selection of the particular final desiccation method which is utilized to effect the desired end product characteristics.

FIG. 1 illustrates the apparatus and technique embodying the forced nitrogen gas ejection-sublimation method of final desiccation wherein recuperated, recycled nitrogen gas and compressed "make-up," nitrogen gas are used to effect the final desiccation.

The frozen particulate solids formed in the second stage freeze-disintegration-evaporation vessel 9 are super cooled and feature a predominance of their remaining moisture content in the form of ice at their outer surface, subsequently the particulates remain substantially separated as they are transferred via the insulated rotary product valve and discharge duct 14 which is attached to the ejection chamber 35, wherein they are entrained by high velocity, low temperature nitrogen gas expanding from the divergent ejector nozzle 32, which is positioned within the ejection chamber 35. The propelling high velocity low temperature gas expanding from the ejector nozzle 32 is converting its pressure energy into velocity energy. This mass of gas is discharged from the nozzle 32 in a directed flow through the ejection chamber 35 and into a convergent-divergent diffuser 36.

As the gas stream passes through the ejection chamber 35 it comes in contact with, and entrains the definite mass of super-cooled frozen particulate solids and some gas which has been discharged from the product valve and duct 14. It imparts to this mass a portion of its own velocity by being decelerated, and most of its heat energy by exchange with the super-cooled particulate mass, effecting sublimation of the ice on the particles outer periphery, and the release of water vapor which then is also entrained. The resultant combined total mass, at the resultant velocity enters the diffuser section 36 where its velocity energy is, in greater part, again converted into pressure (and heat energy), thereby effecting further sublimation of the entrained particles surface ice. The higher pressures attained permit the resultant combined total mass to be discharged to the higher pressure (than in the ejection chamber 35) cyclone dryer chamber 37.

As the combined total mass (particles-water vapor-propelling gas) is expanded from the divergent diffuser section 36 it is impinged by a moderate velocity, dry nitrogen gas which is simultaneously expanding from the divergent ejector nozzle 34, positioned at a right angle to it. The resultant turbulent dispersion of the combined total mass of the two streams is decelerated and exchanging heat, thereby effecting further sublimation. This resultant combined total mass, at the resultant velocity enters the convergent lower portion of the cyclone dryer chamber and is discharged into the quiescent conical exhauster-separator zone 38, wherein the dried, or substantially dried particles precipitate to the lower portion and are removed via a rotary product valve and discharge duct 39. The water vapor-gas stream and any entrained, fine product "dust," are exhausted via the exhaust duct 40 by the centrifugal blower 48.

The substantially dried particulate solids discharged through the rotary product valve and duct 39, into the supplementary ejection chamber 41, are entrained by a high-velocity dry nitrogen gas stream expanding from a divergent ejector nozzle 42, compressed through the convergent-divergent diffuser section 43 and discharged tangentially into the supplementary cyclone-dryer 44, the desiccated particulate solids precipitate to the conical lower quiescent zone 45 and are removed via the rotary product valve and discharge duct 46. The combined water-vapor-gas stream and any entrained, fine, product "dust," are exhausted via the exhaust duct 47 by the centrifugal blower 48. The supplementary or second stage, desiccation components 41 to 47 are only required for final desiccation of certain products.

The combined water-vapor-gas and "dust" stream are exhausted via the exhaust ducts 40 and 47 by the centrifugal blower 48 through the combined exhaust duct 49, to the optional, dual, alternating, electrostatic precipitators 50, wherein all remaining entrained product "dusts" are collected (when required). The combined water-vapor-gas stream is issued from the electrostatic precipitator, through its exhaust ducts 51 to the dual, alternating, plate type condensers 52 whose plates are refrigerated by super-cooled nitrogen gas issued through the insulated gas-line 26 and exhausted via the insulated gas-line 28 through which it is returned to the nitrogen gas supply and recuperation system as previously described. Condensate is periodically removed from the condenser plates by alternately cycled heated air issued through the same gas-line 26.

The water vapor saturated, gas stream is drawn through the plate condenser by the multi-stage axial flow compressor 53 which, in turn, compresses the cooled and dried gas (which subsequently gains heat energy) and re-ejects it through the divergent ejector nozzle 32 which is positioned within the ejection chamber 35. High velocity, dry nitrogen "make-up," gas can be added, as required, via the gas-line and divergent ejector nozzle 31 which is supplied from the pressurized nitrogen gas storage vessel 20 via the gas-line 27 through the auxiliary gas heater 29 which is equipped with an interlocked temperature controller-indicator 30, and the gas-line and regulating valve 33, which also issues heated nitrogen gas to the ejector nozzles 31, 34 and 41.

FIRST ALTERNATE STAGE THREE

Figure 2:
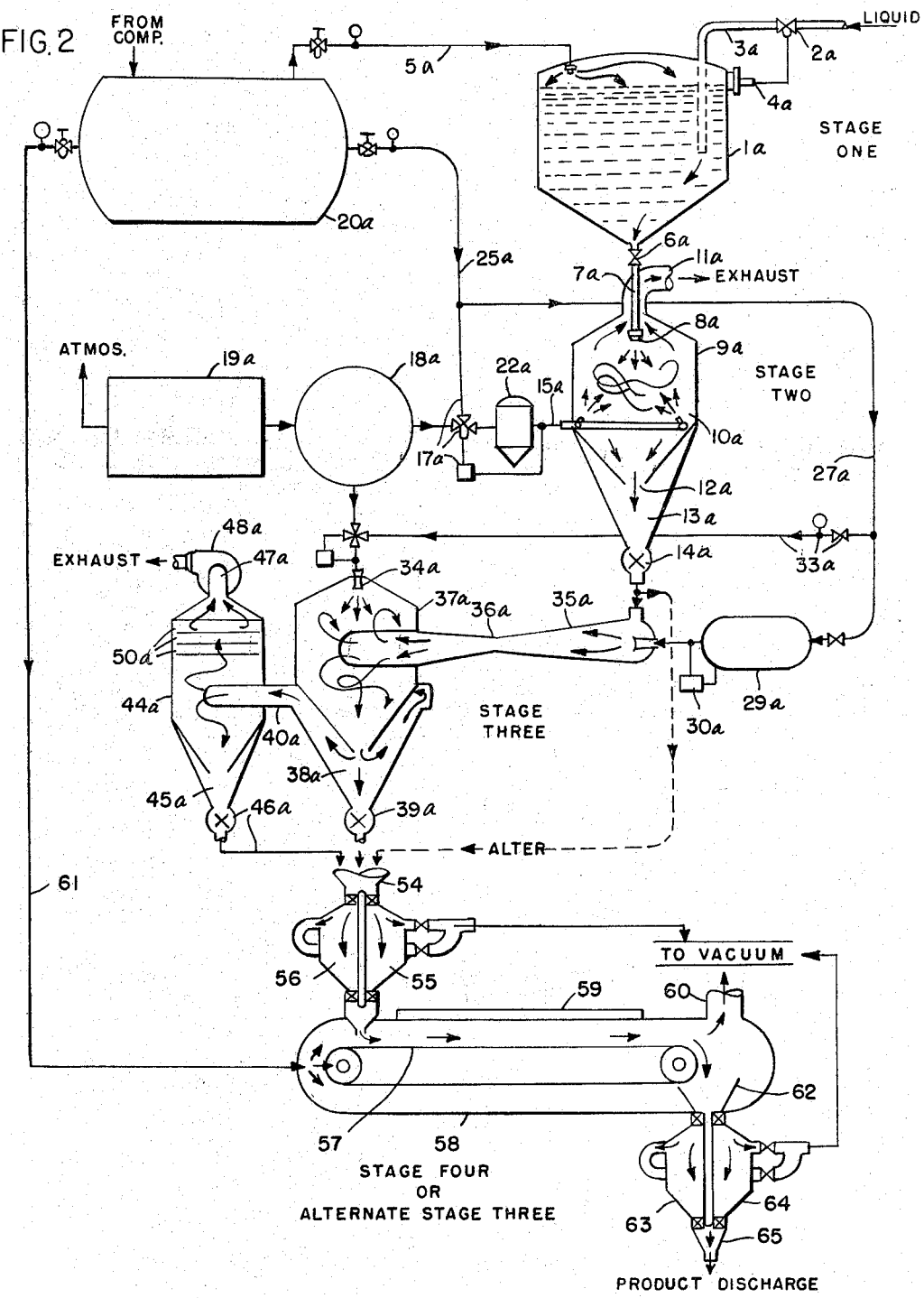

FIG. 2 illustrates an alternate final desiccation apparatus and process wherein compressed air is employed together with super-cooled nitrogen for the freeze-disintegration and evaporation of the starting material and wherein the frozen particulate solids are substantially dried and then transferred to a final desiccation apparatus which employs a vacuum radiation sublimation apparatus to effect the final desiccation. In the operation of the apparatus shown in FIG. 2, the liquid starting material is discharged from the pressurized vessel 1a into the freeze-disintegration-evaporation vessel 9a, which is substantially the same as vessel 9 heretofore described.

Instead of supplying a single gas such as nitrogen to vessel 9a, the nitrogen is combined with compressed dry air in such proportions as to give the desired gas temperature and velocity in vessel 9a. For example, nitrogen from the storage vessel 18a may be combined with compressed air from the storage vessel 20a, as indicated by the flow lines, and the combined material, after passing through a condensate trap, is introduced through line 15a into the manifold 10a of vessel 9a. The super-cooled gas jets 10a in vessel 9a serve to disintegrate the charged liquid as heretofore described in connection with vessel 9, and the saturated gas and air medium is withdrawn through exhaust duct 11a while the frozen solid material is recovered through the valve-controlled outlet 14a.

High velocity dry compressed air is introduced through line 27a and after passing through an auxiliary air heater 29a, is discharged into the ejection vessel 35a which operates substantially as the vessel 35 described in connection with FIG. 1. The vessel 35a discharges tangentially into the cyclone vessel 37a and the turbulence of the material is increased by introducing nitrogen gas or other inert gas through nozzle 34a at high velocity. The vessel 37a is substantially the same as vessel 37 heretofore described. The organic particulates solids are collected in quiescent zone 38a and discharged therefrom via valve and duct 39a. Gas bearing particulate matter is withdrawn through exhaust duct 40a and delivered to the cyclone-separator 44a. Gas bearing particulate matter passing through precipitators 50a is removed through the blower-operated exhaust 48a, the solids being collected within the quiescent zone 45a are discharged through valve and discharge duct 46a to the receptacle 54.

The particulate solids received within the receptacle 54 are discharged through alternating air locks 55 and 56 onto a continuous belt conveyor 57 within a vacuum vessel 58. It should be pointed out that as one alternate processing method the rotary product valve and discharge duct 14a of the second stage may be connected directly to the vacuum vessel 58, and for certain products the forced gas, ejection-sublimation apparatus and steps described above may be omitted. The frozen particles on the belt conveyor 57 are exposed within the vacuum environment to a selected wavelength radiator 59 which emits approximately 95% of its radiation between 0.9 micron wavelength (9,000 A. units) and 1.3 microns wavelength (13,000 A. units). This wavelength radiation readily penetrates planten and albumin tissues in depth (up to 1000 microns diameter and more preferably 650 microns), so that heat is provided to effect the sublimation of the ice surrounding the organic material without causing any heating of the material itself. Therefore, a maximum supply of heat for sublimation of ice is radiated to the frozen particulate solids, thereby accelerating the sublimation action without danger of scorching the outer periphery of the particles. Means, not shown, are preferably provided to intermittently drive conveyor 57 so that the particles will be periodically tumbled and periodically expose new surfaces to the radiation source.

Albumin tissue for example can be penetrated by 90% of radiation between 0.9 micron and 1.25 microns (75% at 0.9 micron wavelength, 100% at 1.2 microns wavelength) and absorbs all radiation over 1.3 microns wavelength at its surface—planten tissue can be penetrated by radiation between 0.85 micron to 2.9 microns wavelength.

During the sublimation operation, the frozen particulates which are to be dried are simultaneously subjected to radiant energy in the selected wavelength, which is issuing heat, relative to the ice, evenly throughout the product (i.e., no excessive heating of the products surface by absorbed wavelength radiation over 1.3 microns wavelength and/or under 0.9 micron wavelength), and maintained under a vacuum pressure gradient which keeps the product in the solid or frozen state while the moisture therein is converted to vapor and transported to the steam-ejector evacuation system.

By supplying the heat of sublimation in the selected wavelength (0.9 to 1.3 microns wavelength) the material is heated substantially uniformly in depth, and there is no scorching of the outer periphery of the product because it receives a minimum (less than 5%) of non-penetrating radiation (over 1.3 microns wavelength and/or under 0.9 micron wavelength) and is also cooled by the escaping water vapor throughout the drying period.

The parameters which control the transfer of heat to the material are the conductivities, emissivities, specific heats, and radiation absorption coefficients of the apparatus components, the material and the driver gas.

This selected wavelength of radiation can be achieved with variety of components, selection of which is determined by the net flow of heat energy (between 0.9 and 1.3 microns wavelength) required. The simplest arrangement is to use: (1) any convenient infra-red radiation source such as tungsten or nickel-chromium wires operating at a temperature of 2500° K., which transmits 70% of its total radiation in the spectral range between 0.8 and 8.9 microns wavelength with maximum intensity at 2.3 microns; (2) any convenient filter source which will pass a maximum of radiation between 0.9 and 1.3 microns, lead glass will transmit 90% of radiation in the 1.0 to 3.0 micron range (with maximum transmission at 1.0 microns) and will filter out 70% of all radiation above and below this wavelength. A ¼″ thick water filter will transmit 90% of radiation between 0.9 to 1.3 microns (90% at 0.9 micron, 100% at 1.0 microns, 55% at 1.2 microns, 10% at 1.3 microns and nothing over 1.7 microns). A selected wavelength radiator utilizing the most desirable arrangement of infra-red source and filters will transmit 90% of its radiant energy between 0.9–1.3 microns wavelength. A wide variety of energy sources, reflectors, filters and simple gratings can be utilized to effect the selected wavelength required for penetrating a given material in depth.

The sublimed water vapor is removed through the evacuation manifold 60 preferably by a four-stage steam-ejector evacuation system (not shown) of adequate capacity for removing the sublimed water vapor while maintaining the required vacuum pressure (approximately 1 mm. Hg). The steam-ejector evacuation system will also provide sufficient pumping speed to permit the "bleed-in" of inert gas issued through line 61, which can provide supplementary heat for sublimation, directly to the iced outer periphery of the frozen particulate solids while simultaneously providing a driving force to accelerate water vapor transport to the evacuation system. The "driver gas" stream issued through line 61 is directed across the particles surfaces during sublimation, thereby effecting a pressure gradient between the particles surfaces and the environment, to provide means for driving the water vapor molecules escaping from the particles surfaces along the pressure gradient and in a directed stream toward the evacuation manifold 60. Thus, the "driver gas" reduces the incidence of water vapor molecules returning to the particulate surface during sublimation, and the rate of removal of water vapor from the particle surfaces and the vacuum vessel is increased.

The desiccated particulate solids drop off the conveyor belt 57 and fall into a collector trough 62, from which they precipitate to the dual alternating interlocked discharge air locks 63 and 64, the final product being discharged through outlet 65.

The mechanism of vacuum-radiation sublimation can be postulated to be a combined heat-mass transfer principle of operation, wherein the selected wavelength radiator supplies the penetrating heat for sublimation to the ice crystals in a vacuum environment, thereby causing the water molecules to sublime from the free surfaces of these crystals. After a water molecule sublimes it passes into the vacuum environment where, after an indeterminate number of collisions with other escaping water vapor molecules and collisions with the vacuum chamber walls and the "bleed-in" driver gas, it eventually reaches the evacuation system where it is permanently removed from the system.

A net flow of water vapor between the ice crystal and the evacuation system requires the establishment of a pressure gradient. Thus, for there to be a net flow, the average concentration and so the pressure in the vacuum environment is less than the pressure of the water vapor molecules escaping from the ice crystal. The "driver" gas, i.e., a high velocity, dry super-cooled gas stream directed across the ice surface and to the duct of the evacuation system, but having a net pressure at the ice crystal less than the saturated vapor pressure over ice at the temperature of the ice surface, but high enough pressure and velocity to "drive" the escaping water vapor molecule from the surface of the ice crystal to the evacuation duct, thereby driving the escaping and colliding water vapor molecules in a direct path to the evacuation duct rather than permitting them to follow a random path.

As drying proceeds, sublimation takes place only from the surface of the ice. As the ice surface recedes within the product, the heat of sublimation must ordinarily be transferred in from the outer surface. According to the particular arrangement used, the heat may flow through either a layer of frozen materials or a layer of dried material. It is desirable to keep the surface at a constant temperature as long as any ice phase remains. If heat is being transferred through a layer of frozen product, the surface temperature must be kept below the freezing point. If drying takes place from the heated surface, heat must flow through a layer of dried material. Because of the low thermal conductivity of the porous, dry material, the surface temperature is limited by the thermal sensitivity of the dry solid rather than by melting of ice.

Most liquid and all solid food products are sufficiently opaque that most heat radiation will not penetrate to any significant distance. Since drying takes place from all surfaces of the product, it is difficult to maintain the optimum rate of heat input without scorching the dry surface. In the present vacuum-radiation sublimation process this difficulty is overcome by utilizing the selected wavelength radiator described above.

SECOND ALTERNATE STAGE THREE

Figure Three illustrates the apparatus and technique embodying the fluidized bed evaporation method of final desiccation, wherein exhaust gas issuing from Stage Two is recuperated and recycled, together with dry make-up gas or air and used to effect the final desiccation.

The term fluidization is used to designate the fluid-solid contacting process in which a bed of finely divided solid particles is lifted and agitated by a rising stream of process gas. At sufficiently high fluid velocity, the particulate bed will be lifted. Since the particles are not bonded together they will move farther apart and open up the interstices to allow easy passages of the gas fluid, and thus the bulk density decreases and the bed expands in volume. At velocities great enough to give a pressure drop equal to the weight of the material in the bed per unit area of column cross-section, the bed expands so that all the particles are no longer touching, and the bed is in the "fluid" state.

Certain of the apparatus used in conjunction with the fluidized bed evaporation apparatus is the same as that described above, and common reference numerals have been used, with the subscript $b$ having been added to designate the parts in the fluidized bed evaporation apparatus.

As has been explained above, the turbulent dispersed stream of organic liquid concentrate enters the insulated reaction vessel 9b from the pressurized liquid storage vessel 1b, via the insulated pipeline 7b and discharge nozzle 8b, where it is disintegrated by impingement of the high velocity super-cooled gas jet stream issuing from the ring manifold 10b, which in turn is supplied by the insulated pipeline 15b leading from the gas supply system. The swirling saturated gas stream exits the vessel via the exhaust duct 11b which exhausts the gas to the gas recuperation system. The frozen particulate solids exit the vessel through rotary product valve and discharge duct 14b, which is inserted in the ejector chamber section of the convergent-divergent manifold 35b. The particulates are entrained by high velocity cold gas expanding from the divergent ejector nozzle 32b that is positioned within the ejector chamber of the convergent-divergent manifold 35b.

A rotary impact screen chamber 70 is positioned in exhaust duct 11b, and is provided with several fine mesh rotating screens which trap the ice particles in the saturated exhaust gas. As the screens are rotated, the ice is melted and drained out of the chamber. The ice-free saturated exhaust gas leaving the impact screens passes through an optically tight cryogenic trap 71 wherein the water vapor entrained in the exhaust gas is condensed on liquid nitrogen cooled baffles, which in turn are supplied with liquid nitrogen from a pressurized storage dewar 66, through regulating valve 68, and lines 67 and 71a. The subsequent "boil-off" of vaporized liquid nitrogen is withdrawn via line 71b and returned to the gas supply system, wherein it is mixed with compressed air after passage through a heat exchanger 72, and transported via pipeline 15b to the gas jet manifold 10b.

When saturated gas is cooled well below its dew point, it is possible to condense substantially all of the water vapor and "dry" the gas. The saturation of the gas leaving the cryogenic trap 71 will be nominal because its dew point approaches the surface temperature of the super-cooled baffle plates as a result of the heat and mass transfer that occur at the boundary between the gas and the cooling plates. Condensate is periodically removed from the cooling plates of the cryogenic trap, either by issuing heated air through the plates, or by circulating heated air or stream through the condenser. While the condensate is evaporated in one condenser, the saturated gas stream can be exhausted into an alternate dual condenser (not shown), and vice versa.

The essentially dry (and colder) exhaust gas exits the cryogenic trap 71 via line 73, and is issued into a heat exchanger 74 wherein it is mixed with dry "make-up" gas or compressed air, as required. The combined cold gas stream leaves the heat exchanger 74 via line 74a and is finally expanded from the divergent ejector nozzle 32b, which is positioned within the ejector chamber section of the convergent-divergent manifold 35b.

The propelling high velocity cold gas jet stream expanding from the ejector nozzle 32b is converting its pressure energy into velocity energy. As this mass of cold dry gas is discharged in a directed flow through the ejector chamber it comes in contact with, and entrains the definite mass of super-cooled frozen particulate solids, which are issued from vessel 9b via duct 14b into the ejector chamber. The gas imparts to this mass a portion of its own velocity by being decelerated, and most of its energy by exchange with the super-cooled particulate mass, effecting some evaporation of the ice on the particles outer surface, and the release of water vapor which then is also entrained with the gas flow. The resultant combined total mass enters the convergent-divergent section of the manifold 35b where its velocity energy is, in greater part, again converted into pressure (and heat energy), thereby effecting further evaporation of the entrained particles surface ice. The higher pressures attained permit the resultant total mass to be discharged via the divergent entrance to a fluidized bed reaction vessel 75, through a grid 76 at the lower portion of vessel 75, and into a resistance heated multiple honeycomb column structure 77 spaced vertically above grid 76. The combined cold gas and particle stream becomes decelerated and fluidized in the honeycomb column structure 77, and exchanges heat with the heated walls of the honeycomb column structure to effect further evaporation and intermediate final desiccation of the frozen particulate solids. The honeycomb column walls are formed of extremely thin stainless steel and are resistance heated by a low voltage-high ampere current supplied by a D.C. rectifier 78. Column wall temperatures of from 250° F. to 450° F. have functioned satisfactorily to dry the particulates without scorching. Grid 76 is also preferably formed of stainless steel.

As the frozen particulate solids whose remaining water content is predominant at the outer periphery in the form of ice are fluidized, the finely divided particulates are lifted and violently agitated by the rising stream of cold process gas. At a sufficiently high velocity the particulate beds will be lifted above the grid 76 into the individual heated honeycomb columns 77. Since the particles are not bonded together they will move further apart, opening up the interstices to allow easy passage of the gas fluid. Thus, the bulk density decreases and the bed expands in volume within each individual honeycomb column. At velocities great enough to give a pressure drop equal to the weight of the material in the bed per unit of column cross-section, the bed expands so that all the particulates are no longer touching, and the bed is in the "fluid" state. The volently agitated frozen particulates are constantly circulating and contacting the heated honeycomb walls effecting rapid evaporation from the ice surface. Because of the violent agitation of the particles, different portions of the particles are intermittently contacting the heated columnar structure, and thus the rate of heat transfer to the particles will be uniform. Simultaneously the cold process gas is warmed up as it passes through the heated column walls and through the interstices between particulates, thereby enabling the gas to carry a greater proportion of water vapor before becoming saturated. At no time does the process gas exceed 32° F. Even though the frozen particulates come into momentary contact with the heated column wall, they also never exceed this temperature. As a result of the intermittent momentary contact with the heated walls, evaporation from the particulates ice surface remains at the highest or "constant rate" drying period.

As the ice surface of the frozen particulates is evaporated, they have less bulk density and become airborne, so that they flow upwardly in vessel 75 and are removed with the saturated exhaust gas via the cyclone 79, which communicates with the upper portion of vessel 75. Cyclone 79 functions to separate the particulates from the gas, with the gas flowing upwardly out of cyclone 79 to exhaust manifold 94, and the particulates pasing outwardly from the bottom of cyclone 79. The substantially desiccated particulates may then be reprocessed through a similar second or third stage fluidized bed for further desiccation, or to an alternate final desiccation apparatus which features continuous vaccum-radiation sublimation and is described hereinafter. When further desiccation is to be accomplished by the use of one or more additional fluidized beds, the gas exhausting from manifold 94 is preferably heated to increase in moisture carrying capacity and reused in the next stage fluidized bed. To effect this, the gas may be passed through a dryer 95 and heater 96 (FIG. 3), or alternatively, warm make up gas may be added to the gas exhausting from manifold 94, if desired. In a preferred process, the gas exhausting from the first stage fluidized bed is heated 27° F. from 32° F. to 59° F. to substantially double its moisture carrying capacity prior to its use in the second stage fluidized bed. The gas exhausting from the second stage fluidized bed is heated to 86° F. and reused in a third stage fluidized bed, and it has been found that in many cases and for many products the three step fluidized bed will achieve the desired degree of product dryness.

As can be best seen in FIG. 5, the fluidized bed 75 is preferably mounted upon a support 80 having an upwardly facing arcuate recess 81. The lower end 82 of fluidized bed 75 is rounded, so as to be shaped complementarily to recess 81 whereby the fluidized bed 75 is capable of being inclined on the support 80 without difficulty. Any suitable means may be provided to incline the fluidized bed 75, and as may be best seen in FIG. 5, the fluidized bed is capable of being inclined through a relatively wide angular range, as shown by the broken line position at 75a. It will be readily appreciated that when the fluidized bed is inclined with respect to the path of the incoming gas entrained particulate matter, the incidence of collisions between the particulates and the sides of the honeycomb columns will be increased. Thus, by merely inclining the fluidized bed 75, the rate of evaporation from the particulates can be increased, and the rate of evaporation can be varied and controlled by changing the angular inclination of the bed 75. The operation can also be controlled by maintaining the exhaust gas temperature constant, by adjusting the inlet gas temperature, and by adjusting the column wall temperature to meet varying demands on the system. One of the major advantages of the fluidized bed multiple column structure is that the ratio of column diameter to bed height can be maintained for optimum fluidization, while maintaining a low vessel height. That is, the diameter of the bed may be doubled or tripled without increasing the bed height, so long as the interior column height to diameter ratio is maintained. This arrangement also facilitates the equal distribution of heat for evaporation by heating all of the columns equally. It will also be appreciated that the multiple column structure also provides greater surface area for distributing heat to the fluidized particles.

The desiccation apparatus and process illustrated in FIG. 3 may also include a vacuum-radiation sublimation method of final desiccation, similar to that previously described. When a final desiccation step is necessary or desirable, the partially desiccated particulates passing from the fluidized bed evaporation vessel are transferred from the cyclone 79 into a receptacle **54*b*, and thence to a pair of alternating air locks 55*b* and 56*b*. The particulates precipitate alternately through dual interlocked and alternating vacuum gate valves 81 and 82 into the loading or entry air locks 55*b* and 56*b*, respectively. Air locks 55*b* and 56*b* are then evacuated via the dual evacuation lines 83 which are equipped with dual, interlocked alternating vacuum valves 84 and 85, which communicate with the evacuation manifold 86 that exhausts into the evacuation system shown generally at 87. When the entry air locks 55*b* and 56*b* have been evacuated to the pressure of the vacuum vessel 58*b*, the dual interlocked alternating exit vacuum gate valves 88 and 89 are opened, permitting the particulate solids to precipitate into the vacuum vessel 58*b*. A manually operable agitator 90 may be provided in duct 91 to evenly spread the particulates to a desired depth on a suitable continuously moving conveyor belt 57*b*. It should also be understood that a rotary discharge "spreader" may be substituted for the manually operable agitator, if desired. The evenly spread layer of particulate solids, which have a substantially dehydrated interior and have their remaining water content in the form of ice substantially situated at their outer periphery, are conveyed under the selected wavelength radiator 59*b* which emits 90% of its radiation between 0.9 micron wavelength (9,000 A.) and 1.3 microns wavelength (13,000 A). A radiation shield 92 is preferably provided above radiation source 59*b* in vessel 58*b* to reflect the rays downwardly onto the product on belt 57*b*. Means may be provided for agitating belt 57*b*** so as to constantly turn the particulates over and present new surfaces for receiving the radiant heat.

The sublimed water vapor is removed through the evacuation manifold **60*b* by a four-stage steam ejector evacuation system (not shown) with sufficient pumping throughout for removing the sublimed water vapor while maintaining the required vacuum pressure (approximately 1 mm. Hg). The steam ejector evacuation system will also provide sufficient pumping speed throughout to permit the "bleed-in" of inert gas or air, as through line 61*b***, which will provide a pressure gradient as well as a "driving" force to accelerate water vapor transport to the evacuation system.

The desiccated particulate solids drop off the returning conveyor belt **57*b*, and fall into the collector trough 62*b* from which they precipitate to the dual alternating interlocked discharge air locks 63*b* and 64*b* which are similar in construction to the entry air locks described above. The desiccated particulate solids can be discharged from the air locks 63*b* and 64*b*** directly to a conventional classifier and/or a vacuum or inert gas packaging unit, as desired.

Specific examples of the process may be set out as follows:

*Example One*

20 gallons of grade A whole milk consisting of approximately 10% milk solids and 90% water were introduced at a pressure of 150 p.s.i.a. and a solution temperature of 170° F. through a discharge nozzle, such as shown at *8a* in FIG. 2, at the rate of 0.8 gal./min. and dispersed in the form of a turbulent hollow cone of overlapping sheets or ligaments of liquid having a cone angle of approximately 55° angle and having clockwise tangential velocity components. In the apparatus such as that shown in FIG. 2, the operation was carried on as follows:

The mixed process gas at a ratio of one part liquid nitrogen to three parts dry compressed air was introduced into a reaction vessel through a ring manifold at a temperature of −100° F. and a pressure of 95 p.s.i.a. and a volumetric flow rate of approximately 1100 c.f.h. The mixed process gas was issued through multiple gas jet nozzles protruding from the ring manifold at a velocity of approximately 650 ft./sec. The jet nozzles were arranged at an angle to the radius and approximately 30° to the circumference of the vessel so that a counterclockwise gas spiral was created. The high velocity counterclockwise spiralling gas streams were subsequently tangentially impinged in countercurrent flow upon the downward clockwise spiralling turbulent hollow cone of overlapping sheets or ligaments of liquid milk. The resultant violent impingement of the opposing streams of gas and liquid effected a disintegration of the turbulent hollow cone of liquid into an array of fine water mists and droplets containing water and milk solids. The fine water mists were instantaneously frozen by the high velocity cold gas stream, as well as the droplets containing water and milk solids.

The fine water mists that were frozen into microcrystalline particles of ice had less mass than the frozen particles containing milk solids and became airborne above the spiralling reaction zone. As they were entrained in the now saturated exhaust gas above the reaction zone and transported to an exhaust duct, as shown at **11*a***, they served as nuclei for homogenous nucleation of water vapor (in the now warmer saturated gas) which condensed upon the outer periphery of the colder microcrystalline particles of ice throughout its transport by the gas stream to the aforesaid exhaust duct. To summarize, a small percentage of the water removed in the stage two reaction vessel was in the form of water vapor which saturated the process gas, while the greatest percentage of water removed was in the form of microcrystalline particles of ice which were also entrained in the saturated exhaust gas and were constantly growing by condensation of water vapor on their outer periphery while they are being separately removed from the vessel.

Simultaneously (during the above operational phenomena), the droplets containing water and milk solids were being frozen into particulate solids (and ice). As these droplets at a temperature of approximately 170° F. were being violently agitated in the −100° F. gas stream in the reaction zone, their surface was first cooled, then the outer periphery was frozen and during the instant the surface was cooling there was a migration of the warmer water and some solids to the outer (colder) periphery of the droplet. This accounted for the partial desiccation of the frozen particulate solids interior and the concentration of solids and ice at their outer periphery. There was also some violent release of entrained warmer air escaping from the interior of the droplet and/or frozen particulate. This escaping gas blew vents or cracks in the frozen particulates outer periphery effecting greater particle porosity.

The concentration of water (ice) at the outer periphery of the frozen particulates, and the existence of vents, cracks and/or "blow-holes" at the outer periphery was verified by running separate tests using solutions of 10%, 20% and 50% of the hexahydrate of cobaltous chloride and water to simulate a liquid food product during the test runs. The chloride is blue when anhydrous and pink hydrated, the pure water being white (ice) when frozen. When the frozen particulates issued from the reaction vessel and were examined under a cold stage microscope one could readily detect the outer ice layer (white) of the particulates over the frozen eutectic (pink) and the desiccated interior portions which were blue. The vents, cracks and "blow-holes" were also in evidence. These test runs confirmed that the frozen particulate solids had a partially desiccated interior and a higher concentration of ice and solids at the outer periphery. The white outer ice layer confirmed the homogeneous nucleation which occurs while the frozen particles were entrained in the saturated gas stream and served as nuclei for the condensation of water vapor upon their outer periphery. Subsequent examination of the trapped exhaust gas issued during these tests confirmed the removal of microcrystalline particles of ice (white) with only occasional particles containing the pink eutectic which indicated the presence of solids.

Simultaneously (during the above operational phenomena) the more massive frozen particulate solids were migrating towards the product removal valve, such as shown at 14*a*. Those particles with insufficient mass to overcome the uplift of the process gas in the reaction zone became airborne and were returned to the reaction zone area. During this period they served as nuclei for homogenous nucleation of water vapor condensing on their surface and also, as they reentered the reaction zone they became wetted and served as nuclei for heterogenous nucleation. That is, other smaller particulate solids were impinged upon their wetted surfaces and frozen thereto, thereby increasing the frozen particulate solids mass until finally it was sufficient to overcome the updraft of the saturated gas in the reaction zone and fell to the lower, more quiescent zone where it was removed separately (from the saturated exhaust gas and its entrained microcrystalline particles of ice) via the product removal valve.

The frozen particulate solids of milk and ice removed via the product removal valve of vessel averaged −80° F. temperature and had 15% less water than the original milk. The water was removed in the form of water vapor and microcrystalline particles of ice entrained in the saturated exhaust gas which was separately removed via the exhaust duct. The remaining water was predominant as ice at or near the outer periphery of the frozen particulate solids which averaged 650 microns particle size. The frozen particulates were homogenous and featured a partially desiccated interior.

The frozen particulate solids of ice and milk featuring 15% less water (ice) and the other product characteristics described above were issued into a vacuum vessel, such as shown at 58, and deposited in a thin layer upon the conveyor belt. The conveyor belt was continuously moving with interrupted motion, thereby effecting a continual tumbling and forward progress of the frozen particulate solids towards and through the radiation zone while they were exposed to the vacuum environment of 1 mm. Hg pressure. The heat for sublimation was supplied by the selected wavelength radiator which emitted approximately 95% of its radiation between 0.9 and 1.3 microns wavelength. This wavelength of radiation readily penetrated the milk solids. The ice at the surface of the frozen particulate solids was opaque to this wavelength of radiation and readily absorbed the radiation which served as heat for sublimation of the ice. As the particles tumbled on the moving conveyor belt, they were continuously exposing new ice surfaces to the radiator. As the surface ice was sublimed to water vapor, a maximum of radiation could still be applied without scorching the organic milk solids (since the radiation at the specified wavelength passed through the exposed milk solids). This was of great importance as the "ice front," receded into the interior of the frozen particulate and radiant heat was still supplied at a maximum rate.

As the ice front receded the escaping water vapor had ready access to the vacuum environment through the various vents, cracks and "blow-holes" previously described. This ready access to the vacuum was far more expeditious than having the sublimed water vapor diffusing only through the previously dried portion of milk solids. As the water vapor molecules escaped from the particulates surface they were impinged by and driven towards an evacuation port, such as shown at 60, by a high velocity stream of "bleed-in" driver gas which was expanded into the vacuum vessel via a gas line 61 as a controlled "leak." The expanded "bleed-in" or "leaked in" driver gas provided a driving force to accelerate transport of the sublimed water vapor to the evacuation system rather than depending upon the random motion of water vapor molecules eventually immigrating from the particles surface to the evacuation port. An added benefit of the "driver" gas was that it reduced the proportion of water vapor molecules returning to and reentering the particulate, as is common in the later stages of freeze drying.

The evacuation system provided sufficient pumping speed to maintain 1 mm. Hg vacuum pressure at the particulates surface after introduction of the nitrogen driver gas, thus establishing a pressure gradient within the vacuum vessel and from the particle surface to the vacuum environment.

The importance and effectiveness of the selected wavelength radiator was verified during separate tests wherein common infra-red radiation, as supplied by a common infra-red quartz tube element, was radiation to the frozen particulate solids under the same conditions and with the same type particles as were heated by the radiation between 0.9 and 1.3 microns wavelength. The product was scorched with the common infra-red radiator and was not scorched by the selected wavelength radiator when both were radiating at an identical constant rate of output kw. When the common infra-red lamps output kw. was cut back to prevent scorching, it took considerably longer to process the particulates than with the selected wavelength radiator.

The importance and effectiveness of the bleed in gas was also verified in a similar manner during further separate tests. Final desiccation of the frozen particulates was effected much more rapidly when the bleed in driver gas was employed.

The importance of tumbling the frozen particulates on the moving conveyor belt as it passed through the radiation zone was also verified by separate tests. It took a considerably shorter period of time to achieve final desiccation when the particulates were constantly tumbled or agitated and presenting new surfaces to the radiator.

The importance and effectiveness of having the particulates exhibit the properties and characteristics as previously described when they issued from the reaction vessel was also verified in separate tests. It took considerably longer to achieve final desiccation on particles that had merely been frozen by spraying the liquid milk into a cold gas environment and not affecting any water removal or concentration of solids and ice at the outer periphery of the particulates or having a partly desiccated interior of the frozen particulates prior to processing them through the vacuum vessel (58*a*).

The final end product removed from the vecuum vessel can best be described as desiccated, extremely porous, homogenous, very soluble spherically particulate milk solids. The average particle size was approximately 650 microns. The moisture remaining was approximately 0.5%. The particles were very hygroscopic and readily reconstituted in cold water. There was no detectable loss and/or change of flavor and aroma of the reconstituted dry milk solids when compared to the original grade A whole milk when tested by a triangle taste panel of dairy experts. Furthermore, there was no agglomeration during reconstitution of the dried whole milk, as was experienced with conventionally freeze dried whole milk which would not reconstitute without agglomerating and which was not homogenous because the butterfat had separated during freezing (by stratification) using conventional freeze drying by the foam and freeze technique followed by a milling and grinding operation to obtain the desired particle size.

*Example Two*

20 gallons of skim milk consisting of approximately 9% milk solids and 91% water were processed through a reaction vessel, such as that shown at 9b in FIG. 3 under identical conditions to those previously described in Example One. The frozen particulate milk solids issued from the vessel via a product removal valve (14b) feature substantially identical properties and characteristics as the frozen whole milk solids similarly removed in Example One.

The frozen particulate solids of ice and milk featuring 15% less water (ice) and the other product properties and characteristics described above were then processed to a fluidized bed vessel (75) via the product removal valve, which was inserted in the ejector chamber section of a convergent-divergent manifold, such as that shown at 35b. The frozen particulates were entrained by high velocity cold gas expanding from a divergent ejector nozzle (32b) that was also positioned within the ejector chamber of the convergent-divergent manifold. The propelling high velocity gas jet stream at a temperature of 20° F. expanding into said ejector chamber was converting its pressure energy into velocity energy as it came in contact with and entrained the definite mass of frozen particulate solids of milk and ice at a temperature of −80° F. issuing into said ejector chamber from the product removal valve. The gas imparted to this mass a portion of its own velocity by being decelerated and most of its heat energy by exchange with the super-cooled particulate mass, effecting some evaporation of the ice on the particles outer surfaces, and the release of water vapor which was then entrained with the gas flow. The resultant combined total mass entered the convergent-divergent section of the manifold (35b) where its velocity energy was, in greater part, again converted into pressure (and heat energy), thereby effecting further evaporation of the entrained particles surface ice. The higher pressure attained permitted the resultant total mass to be discharged via the divergent entrance to the fluidized bed reaction vessel through a grid at the lower portion of the vessel and thence into the heated multiple honeycomb (hexagonal in cross section) column section spaced above the grid. The combined cold gas and particle stream became decelerated and fluidized in the heated honeycomb column structure, and exchanged heat with the heated walls of the honeycomb structure which were maintained at a temperature of 375° F. and provided the heat for evaporation of the ice predominant at the outer periphery of the frozen particles as they were lifted and violently agitated by the rising stream of cold process gas. Since the particles were not bonded together, they moved further apart, opening up the interstices to allow passage of the gas fluid. Simultaneously the agitated frozen particles were constantly circulating and intermittently and momentarily contacting the heated honeycomb walls effecting rapid evaporation from the ice surface of the particles. Also, simultaneously the cold process gas was warmed from 20° F. to 32° F. as it passed through honeycomb columns and the interstices between the particulates, thereby enabling the gas to carry a greater proportion of water vapor before becoming saturated. As a result of the intermittent momentary contact with the heated walls, evaporation from the particles ice surface remained at the highest or "constant rate" drying period. Even though the frozen particulates came into momentary contact with the heat walls they were not scorched since they were supported in the cold gas stream.

As the ice was evaporated from the frozen particulates they had less bulk density and became airborne, so that they were carried upwardly in the fluidized bed vessel and were removed with the saturated exhaust gas (as a temperature of 32° F.) via a cyclone, such as shown at 79, wherein the particles were separated from the gas with the gas flowing upwardly out of the cyclone to exhaust and the particulates passing outwardly from the bottom of the cyclone.

The milk particles separated and removed from the cyclone were found to have approximately 20% of their original water remaining in the form of ice. The saturated exhaust gas was then processed through a commercial dryer and heated from 32° F. to 59° F. which doubled its moisture carrying capacity. It was then recirculated to an identical second manifold, such as shown at 35b, and a second vessel, such as shown at 75. Meanwhile the particles issued from the cyclone were reissued into the aforesaid second manifold and vessel and reprocessed as previously described above with the dry gas now at a temperature of 59° F. The final end product removed from the second vessel and second cyclone were found to have less than 5% water remaining which was sufficient dehydration for the dry skim milk. This final end product exhibited identical product properties and characteristics as that end product previously described in Example One.

*Example Three*

20 gallons of grade A whole milk consisting of approximately 10% milk solids and 90% water was processed through a reaction vessel, such as that shown at 9b in FIG. 3, and a fluidized bed and cyclone under identical conditions to those described in Example Two except that the frozen milk particulates featuring 20% water (ice) remaining as they passed from the cyclone. These particles were issued directly into a vacuum-radiation-sublimation vessel, such as that shown at 58b in FIG. 3 and processed in an idenitcal fashion to that previously described in Example One. The final desiccated product issued from the vacuum vessel was found to have 0.45% water remaining and exhibited similar properties and characteristics as the desiccated whole milk solids previously described in Example One.

*Example Four*

20 gallons of skim milk was processed under identical conditions and in a similar manner as that previously described in Example Two except that the heated honeycomb column walls and the vessel were inclined at an angle of 45°. This increased the incidence of contact between the fluidized frozen particles and the heated honeycomb walls and simultaneously facilitated the introduction of a larger volume of process gas which in turn permitted removal of a larger volume of water vapor in a given time with a given flow rate of particulates.

The end product issued from the cyclone was identical to that previously described in Example Two. However, only 75% as long a time was required to effect the final desiccation.

*Example Five*

20 gallons of skim milk was processed under identical conditions and in similar manner through a reaction vessel, such as that shown at 9 in FIG. 1, under identical conditions to that previously described in Example One. The frozen particulate milk solids issued from the vessel via the product removal valve 14 featured identical properties and characteristics as the frozen whole milk solids similarly removed in Example One.

The frozen particulate solids of milk and ice (with 15% of the water removed) were discharged via the valve 14 into the ejection chamber 35, as indicated in FIG. 1, wherein they were entrained by a nitrogen gas stream at 25° F. temperature, expanding from the divergent ejector nozzle 32 at approximately 650 ft./sec. velocity. The gas stream imparted its own velocity upon the frozen particles and most of its heat energy by exchange with the frozen particles, thereby effecting sublimation of the ice on the particles outer periphery and the release of water vapor which was also entrained. The resultant combined total mass, at the resultant velocity, entered a convergent-divergent diffuser section, such as shown at 36, where its velocity energy was, in greater part, converted into friction-pressure (and heat energy), thereby effecting further sublimation. The higher velocity attained permitted the resultant combined total mass to be discharged to a higher pressure cyclone drying chamber, such as that indicated by the numeral 37 in FIG. 1, where it was impinged by, and entrained by, a nitrogen gas stream at 30° F., expanded from a divergent ejector nozzle (34) at approximately 650 ft./sec. velocity. The combined turbulent streams were then converged at the conical lower portion of the drying chamber and discharged into quiescent conical exhauster separator (38). The dried particles, containing about 6.0% moisture, precipitated to the lower portion and were removed via a rotary product valve (39), while the water vapor and gas stream and any entrained fine product "dust" were exhausted via a duct 40 and blower 48 to electrostatic precipitators 50 and gas recovery system 52 and 53.

The final product, containing 15% moisture, was highly porous, hygroscopic, and was readily reconstituted into skim milk.

*Example Six*

20 gallons of reconstituted whole dry milk concentrate, consisting of 2 parts water to one part of dry milk solids, were discharged at a pressure of 120 p.s.i. and a temperature of 155° F. through the discharge nozzle in the apparatus as shown in FIG. 1, as described in Example Five, except that the nitrogen gas from the jets had a temperature of −135° F., a pressure of 95 p.s.i., and a velocity of approximately 650 ft./sec. Also, in the second stage where the material was passed into the ejection chamber, the nitrogen gas had a temperature of 30° F. and a velocity of approximately 650 ft./sec. and the nitrogen gas expanded into the cyclone drying chamber had a temperature of 32° F. and a velocity of approximately 650 ft./sec.

In the final step, the frozen particle solids were passed into a vacuum vessel maintained at a pressure of 1 mm. Hg and arranged substantially as shown in FIG. 2. The process carried on therein exposed the particulate solids to a selected wavelength radiation of 1.3 microns wavelength and a stream of dry nitrogen gas at a temperature of 70° F. and a velocity of approximately 700 ft./sec. which was expanded into the vacuum vessel to provide a driving force to accelerate transport of the sublimed water vapor to the evacuation system. The evacuation system provided sufficient pumping speed to maintain 1 mm. Hg pressure in the vacuum vessel after introduction of the nitrogen driver gas. The final moisture content was 0.56%.

*Example Seven*

20 gallons of whipping grade cream were run as described in Example One except that the liquid cream temperature was 150° F. and pressure was 125 p.s.i.a., and the mixed process gas temperature was −200° F. and issued through the ring manifold at 95 p.s.i.a. The desiccated particles sizes averaged 500 microns and exhibited similar product properties and characteristics to those previously described in Example One. The dry cream solids readily reconstituted into whipping grade cream and were subsequently whipped into a full-bodied and fluffy whipped cream.

*Example Eight*

20 gallons of strained orange juice containing 20% orange solids was processed as previously described in Example One herein, except that liquid temperature was 140° F. and the liquid pressure was 145 p.s.i.a. The mixed process gas was at a temperature of −170° F. The desiccated orange solids averaged 375 microns particle size and exhibited similar product properties and characteristics to those previously described in Example One.

*Example Nine*

20 gallons of strained tomatoes containing 25% salt free tomato solids were run, as described in Example One, except that the liquid temperature was 190° F. at a pressure of 95 p.s.i.a. The desiccated tomato solids featured identical product properties and characteristics to that previously described in Example One. Particle sizes averaged 700 microns. It was also noted that there was no damage to cell structure of the desiccated tomato solids which reconstituted readily into a tomato juice drink or a tomato paste as desired.

*Example Ten*

20 gallons of strained tomatos containing 25% salt free tomato solids were run, as described in Example Two, except that super-cooled carbon dioxide gas was used at a temperature of −90° F. Carbon dioxide gas was also used in the fluidized bed evaporation vessel. Otherwise, the process is substantially as described in Example Two. The final moisture content was 7.5%.

*Example Eleven*

20 gallons of orange juice concentrate containing 33% of solids were processed, as described in Example Five herein, except that super-cooled nitrogen gas and compressed dry air was used in the proportions of 15% nitrogen and 85% air, the temperature of the combined discharged gas from the jets being −90° F. Further, in the ejection chamber, the gas consisted of 100% air and in the cyclone chamber it consisted of 5% nitrogen and 95% air. The final moisture content was 15.3%.

*Example Twelve*

The process was carried out, as described in Example One, except that super-cooled nitrogen and compressed air was used in the proportion of 10% nitrogen and 90% air, the temperature of the combined gas as discharged from the jet nozzles was −40° F. The final moisture content was 1.0%.

While in the foregoing specification, I have set forth certain embodiments of the invention in considerable detail for the purpose of illustrating the invention, it will be understood that such details of procedure and structure may be varied widely by those skilled in the art without departing from the spirit of my invention.

I claim:

1. In a process for desiccating organic material in liquid solution, the steps of: disintegrating said solution into a plurality of droplets, concentrating a predominant percentage of the moisture in each droplet at the exterior thereof in the form of ice to partially desiccate the interior of each droplet, and subliming the ice from said particles so as to produce a desiccated product.

2. In a process for desiccating organic material in liquid solution, the steps of: introducing a conically dispersed turbulent spray of solution into a confined zone; impinging upon said spray high velocity streams of dry gas having a temperature below the freezing point of said solution to disintegrate the spray into liquid mists, droplets of pure water, and droplets including organic material; simultaneously freezing said droplets and mists to form particles of pure ice and frozen particles having a nucleus of organic material, while evaporating liquid therefrom to saturate said gas and partially desiccate the particles having a nucleus of organic material, whereby the predominant percentage of their remaining liquid is concentrated at the exterior thereof in the form of ice; withdrawing the saturated gas and particles of ice from said zone, and separately withdrawing the ice incrusted, partially desiccated particles having a nucleus of organic material from said zone.

3. The process of claim 2 in which the withdrawn gas is freed of moisture and ice particles, and is directed in high velocity streams upon the withdrawn frozen particles for additional removal of moisture therefrom.

4. The process of claim 2 in which the streams of gas are directed tangentially to the conical spray of solution, and in a spiral direction with respect thereto.

5. The process of claim 2 in which the partially desiccated ice incrusted particles having a nucleus of organic material are passed in a gaseous stream through a constricted zone.

6. The process of claim 5 in which the gaseous stream and ice incrusted particles are introduced into an enlarged separating zone after passing through said constricted zone.

7. The process of claim 2 in which the frozen particles having a nucleus of organic material are maintained under vacuum and subjected to the action of a radiation source emitting approximately 95% of its radiation between 0.9 micron wave length and 1.3 microns wave length.

8. In a process for desiccating organic material in liquid solution, the steps of: introducing the solution into a first confined zone; impinging upon said solution first high velocity streams of dry gas having a temperature below the freezing point of said solution to disintegrate the solution into liquid mists and droplets; freezing said droplets and mists to form particles of pure ice and particles having a nucleus of organic material, while simultaneously evaporating liquid therefrom; withdrawing the resulting vapor and particles of ice from said zone; separately withdrawing the frozen particles having a nucleus of organic material from said zone and entraining them in a second high velocity stream of gas; introducing said second stream of gas and entrained particles into a second confined zone having a heated columnar structure therein; imparting sufficient velocity to said second stream of gas and entrained particles so as to space said particles from one another, and to cause said particles to intermittently engage said columnar structure and sublime said ice whereby a large percentage of the liquid in said particles is removed to saturate said second stream of gas; and withdrawing said second stream of gas from said second confined zone and separating said substantially dried particles therefrom.

9. The process of claim 8 including the steps of, removing the particles of ice from the gas exhausting from the first confined zone, drying said gas to remove the vapor therefrom, and reusing said gas to entrain the frozen particles issuing from said first confined zone therein.

10. The process of claim 9 in which the separated substantially desiccated particles are introduced into a third confined zone maintained under vacuum, and subjected to the action of a radiation source emitting approximately 95% of its radiation between 0.9 micron wave length and 1.3 microns wave length.

11. In a process for desiccating organic material in liquid solution, the steps of: introducing a conically dispersed turbulent spray of solution into a first confined zone; impinging upon said spray in counter-current flow high velocity streams of dry gas having a temperature below the freezing point of said solution to disintegrate the solution into liquid mists and droplets; freezing said droplets and mists to form particles of pure ice and particles having a nucleus of organic material, while simultaneously evaporating liquid therefrom to partially desiccate the particles having a nucleus of organic material and concentrate their remaining moisture in the form of ice at the outer portion thereof; withdrawing the resulting saturated gas and particles of ice from said zone; removing the particles of ice from said saturated gas; drying said gas to remove the vapor therefrom; separately withdrawing the frozen partially desiccated particles having a nucleus of organic material from said zone; redirecting said dried, ice free gas so as to entrain the partially desiccated particles therein; introducing said gas and entrained particles into a vessel with a second confined zone having a heated columnar structure therein; imparting sufficient velocity to said gas and entrained particles so as to space said particles from one another; inclining said vessel to increase the incidence of the intermittent engagement of said particles with said columnar structure to sublime said ice whereby a large percentage of the liquid in said particles is removed to saturate said gas; and withdrawing said gas from said second confined zone and separating said substantially dried particles therefrom.

12. In a desiccation process for organic materials including discrete frozen particles having ice incrustations, the steps of introducing said particles into a vessel having a heated columnar structure, and passing a dry gas through said vessel at sufficient velocity to suspend said particles so that they are spaced from one another, whereby said particles are caused to intermittently contact said heated columnar structure to sublime said ice incrustations and saturate said gas.

13. In a desiccation process for organic materials including discreate frozen particles having ice incrustations, the steps of introducing said particles into a vessel having a columnar structure therein, passing a dry gas through said vessel at sufficiently high velocity to suspend said particles so that they are spaced from one another and will intermittently contact said columnar structure, heating said columnar structure whereby sublimation of said incrustations takes place upon contact of said particles with said columnar structure to saturate said gas, and separating the dried particles of organic material from said gas and withdrawing them from said vessel.

14. In a process for desiccating organic material in liquid solution, the steps of: introducing the solution into a confined zone; disintegrating the solution so as to form liquid mists and droplets; freezing said droplets and mists to form particles of pure ice and frozen particles having a nucleus of organic material, and simultaneously evaporting liquid therefrom; withdrawing the resulting vapor and particles of ice from said zone, and separately withdrawing the particles having a nucleus of organic material from said zone.

15. In a process for desiccating organic material in liquid solution, the steps of: introducing the solution into a confined zone; impinging upon said solution high velocity streams of dry gas having a temperature below the freezing point of said solution to disintegrate the solution into liquid mists and droplets; simultaneously freezing said droplets and mists to form particles of pure ice and frozen particles having a nucleus of organic material while evaporting liquid therefrom; withdrawing saturated gas and particles of ice from said zone, and separately withdrawing the particles having a nucleus of organic material from said zone.

16. In a process for desiccating organic material in liquid solution, the steps of: introducing the solution into a confined zone; disintegrating and freezing the solution to form frozen particles of pure ice, frozen particles having a nucleus of organic material, and liquid mists; evaporting said liquid mists and evaporting liquid from said particles to partially desiccate the interior of the particles having a nucleus of organic material and to concentrate the remaining liquid in the form of ice at the periphery thereof; withdrawing the resulting vapor and particles of ice from said zone, and separately withdrawing the frozen particles having a nucleus of organic material from said zone.

17. In a process for the desiccation of an organic product having water as a constituent thereof, the steps of dividing said product into a plurality of particles, freezing said particles in a manner so as to concentrate the water in the form of ice at the outer periphery of the particles, passing said particles into a restricted zone maintained under vacuum, and subjecting said particles to radiation having a wave length sufficient to sublime the water from the particles without imparting heat to the product.

18. The process of claim 17 wherein the wave length of approximately 95% of the radiation is between 0.9 micron and 1.3 microns.

19. The process of claim 17 wherein different portions of said particles are subjected to intermittent radiation.

20. The process of claim 19 wherein said particles are turned to expose different portions thereof to said radiation.

21. The process of claim 17 wherein gas under pressure is admitted into said zone to facilitate the sublimation of water from said particles.

22. In a process for the desiccation of organic materials having water as a constituent thereof, the steps of passing said materials into a restricted zone maintained under vacuum while subjecting said materials to radiation in the range of between 0.9 micron wave length and 1.3 microns wave length.

23. In a process for the desiccation of organic materials having water as a constituent thereof, the steps of passing materials having a diameter of less than 1,000 microns into a restricted zone maintained under vacuum while subjecting said materials to radiation in the range of between 0.9 micron wave length and 1.3 microns wave length.

24. In a process for the desiccation of an organic product having a liquid as a constituent thereof, the steps of freezing said product, passing said product into a restricted zone maintained under vacuum, and subjecting said product to radiation having a wave length sufficient to sublime the frozen liquid from said product without imparting heat to the product itself.

25. In a desiccation process for organic materials including discrete frozen particles having ice incrustations, the step of passing said incrusted particles in a high velocity stream of gas through a constricted zone at varying relative velocities with respect to said gaseous stream for frictional contact therewith.

26. The process of claim 25 in which said gas and particles, after leaving said constricted zone, are discharged into an enlarged separation zone.

27. In a desiccation process for organic materials, the steps of imparting high velocity to frozen organic particles having ice incrustations in a high velocity stream of gas, passing said stream through a constricted zone to reduce the velocity of said gas and then beyond said constricted zone into an expanding zone to increase the velocity thereof, while said particles move at different relative velocities with respect to said gas into frictional contact therewith.

28. In apparatus for the desiccation of organic materials including discrete frozen particles having water in the form of ice incrustations: a hollow vessel having an inlet and an outlet; a honeycomb structure in said vessel between said inlet and said outlet and defining a plurality of columns; means for heating said honeycomb structure; means for introducing dry gas, together with said particles, into said vessel through said inlet, past said honeycomb structure, and out of said vessel through said outlet to sublime said ice incrustations by engagement of said particles with said honeycomb structure; and means for separating the resulting saturated gas from the resulting dried particles.

29. Apparatus as defined in claim 28 wherein said vessel is mounted on a support having an arcuate surface, said vessel having a rounded portion seated within said curved portion.

30. In apparatus for the desiccation of liquid containing materials, a generally vertical vessel having a gas outlet at its top and a solids outlet at its bottom, nozzle means for introducing materials into said vessel in a downwardly directed conical spray, a manifold in an intermediate portion of said vessel below said nozzle, upwardly inclined jet nozzles carried by said manifold for discharging gas upwardly toward said nozzle into said spray, and means for supplying gas at temperatures below freezing and under pressure to said manifold.

31. Apparatus as defined in claim 30 wherein baffles are provided in the lower portion of said vessel and are inclined downwardly and inwardly to form a restricted port communicating with a quiescent zone therebelow.

32. Apparatus as defined in claim 31 wherein a conduit having a constriction therein communicates with said quiescent zone for receiving materials therefrom and which is provided at the end thereof adjacent said solids outlet with means for discharging gas into said conduit.

33. In apparatus for the desiccation of liquid containing materials, a generally vertical vessel having a gas outlet at its top and a solids outlet at its bottom, nozzle means for introducing materials into said vessel in a downwardly directed conical spray, a manifold in an intermediate portion of said vessel below said nozzle, upwardly inclined jet nozzles carried by said manifold for discharging gas upwardly toward said nozzle into said spray, an ejection chamber communicating with said solids outlet, nozzle means for introducing dry gas at high velocity into said ejection chamber to entrain frozen particulates entering into said ejection chamber through said solids outlet with said gas, and to cause frictional engagement between said particulates and said gas whereby partial sublimation of said particulates is effected, means in said ejection chamber for increasing the frictional contact between said gas and said particulates to increase the sublimation of said particulates, a drying chamber communicating with said ejection chamber and adapted to receive said gas and entrained particulates therefrom, and further desiccation means associated with said drying chamber for subliming substantially all of the remaining moisture from said particulates.

34. Apparatus as defined in claim 33 wherein said further desiccation means includes nozzle means in said drying chamber for impinging dry gas on said flow of gas and entrained particulates at right angles thereto, and means in said drying chamber for separating said particulates from said gas.

35. Apparatus as defined in claim 34 wherein said further desiccation means includes a supplementary ejection chamber communicating with said drying chamber and adapted to receive said particulates therefrom, nozzle means for introducing dry gas at high velocity into said supplementary ejection chamber to entrain said particulates with said gas and to cause frictional engagement between said particulates and said gas, means in said supplementary ejection chamber for increasing the frictional contact between said gas and said particulates, and means for separating said particulates for said gas.

36. Apparatus as defined in claim 34 wherein said further desiccation means includes an evacuated vessel communicating with said drying chamber and adapted to receive said particulates therefrom, radiation means in said vessel and adapted to emit approximately 95% of its radiation between 0.9 micron wave length and 1.3 microns wave length for subliming substantially all of the moisture from said particulates, means for removing the water vapor from said vessel, and means for separately removing said particulates from said vessel.

37. Apparatus as defined in claim 33 wherein said further desiccation means includes a honeycomb structure in said drying chamber defining a plurality of columns, means for heating said honeycomb structure, means for imparting sufficient velocity to said gas and entrained particulates to space said particulates from one another and to move said particulates into intermittent engagement with the walls of said columns, means for removing said gas from said chamber and means for separately removing said particulates from said chamber.

38. In a desiccation process for organic materials including discrete frozen particles having ice incrustations, the steps of introducing said particles into a vessel having a columnar structure therein, passing a dry gas through said vessel at sufficiently high velocity to suspend said particles so that they are spaced from one another and will intermittently contact said columnar structure, heating said columnar structure whereby sublimation of said incrustations takes place upon contact of said particles with said columnar structure to saturate said gas, inclining said vessel so as to increase the incidence of collisions between said particles and said columnar structure, and separating the dried particles of organic material from said gas and withdrawing them from said vessel.

39. In a desiccation process for organic materials including discrete frozen particles having ice incrustations, the steps of introducing said particles into a vessel having a columnar structure therein, passing a dry gas through said vessel at sufficiently high velocity to suspend said particles so that they are spaced from one another and will intermittently contact said columnar structure, heating said columnar structure whereby sublimation of said incrustations takes place upon contact of said particles with said columnar structure to saturate said gas, separating the dried particles of organic material from said gas and withdrawing them from said vessel, introducing said withdrawn particles into a second vessel having a heated columnar structure therein, and drying and heating said withdrawn gas and passing the same through said second vessel at sufficiently high velocity to suspend said particles so that they are spaced from one another, whereby said particles are caused to intermittently contact said heated columnar structure to effect further desiccation of said particles.

40. Fluid bed apparatus comprising: a hollow vessel having inlet means and outlet means; heat transfer means in said vessel between said inlet means and said outlet means, said heat transfer means including a wall structure means within said vessel defining a plurality of columns; grid means adjacent to said heat transfer means; means for introducing a particulate substance into said vessel through said inlet means; means for fluidizing said substance in said heat transfer means; means for maintaining a temperature difference between said heat transfer means and said substance including means for heating said wall structure means; and means for removing said substance from said vessel through said outlet means.

41. Fluid bed apparatus as defined in claim 40 wherein said grid means is spaced below said wall structure means.

42. Fluid bed apparatus as defined in claim 40 wherein the ratio of column diameter to the height of said wall structure means is constant throughout said vessel.

References Cited by the Examiner
UNITED STATES PATENTS

| | | | |
|---|---|---|---|
| 1,104,920 | 7/1914 | Osborne | 34—5 |
| 1,213,887 | 1/1917 | Krause | 261—79.1 |
| 1,976,204 | 10/1934 | Voorbees | 34—5 |
| 2,020,719 | 11/1935 | Bottoms | 62—74 |
| 2,083,072 | 6/1937 | Lindsey | 62—74 |
| 2,413,420 | 12/1946 | Stephanoff | 34—10 |
| 2,471,035 | 5/1949 | Hurd | 34—92 |
| 2,533,125 | 12/1950 | Levinson | 34—5 |
| 2,657,473 | 11/1953 | Montgomery | 34—57 |
| 2,659,986 | 11/1953 | Hink | 34—5 |
| 2,668,364 | 2/1954 | Colton | 34—5 |
| 2,731,731 | 1/1956 | Hink et al. | 34—5 |
| 2,813,350 | 11/1957 | Berger | 34—5 |
| 2,911,730 | 11/1959 | Schaub et al. | 34—57 |
| 2,921,383 | 1/1960 | Morris | 34—57 |
| 2,931,711 | 4/1960 | Walker | 34—57 |
| 3,019,179 | 1/1962 | Hoppe | 34—5 |
| 3,024,117 | 3/1962 | Barlow | 62—58 |
| 3,087,253 | 4/1963 | Wulf | 34—57 |

References Cited by the Applicant
UNITED STATES PATENTS 2,083,072  6/1937  Lindsey.

WILLIAM J. WYE, *Primary Examiner.*

ROBERT A. O'LEARY, *Examiner.*

W. E. WAYNER, *Assistant Examiner.*